June 16, 1925. Re. 16,098

F. MÜLLER

GRINDING MACHINE AND METHOD OF GRINDING

Original Filed Jan. 27, 1917 10 Sheets-Sheet 1

June 16, 1925.

F. MÜLLER

Re. 16,098

GRINDING MACHINE AND METHOD OF GRINDING

Original Filed Jan. 27, 1917 10 Sheets-Sheet 2

Inventor
Friederich Müller
By Joseph V. Schofield
Attorney

June 16, 1925.
Re. 16,098
F. MÜLLER
GRINDING MACHINE AND METHOD OF GRINDING
Original Filed Jan. 27, 1917 10 Sheets-Sheet 3
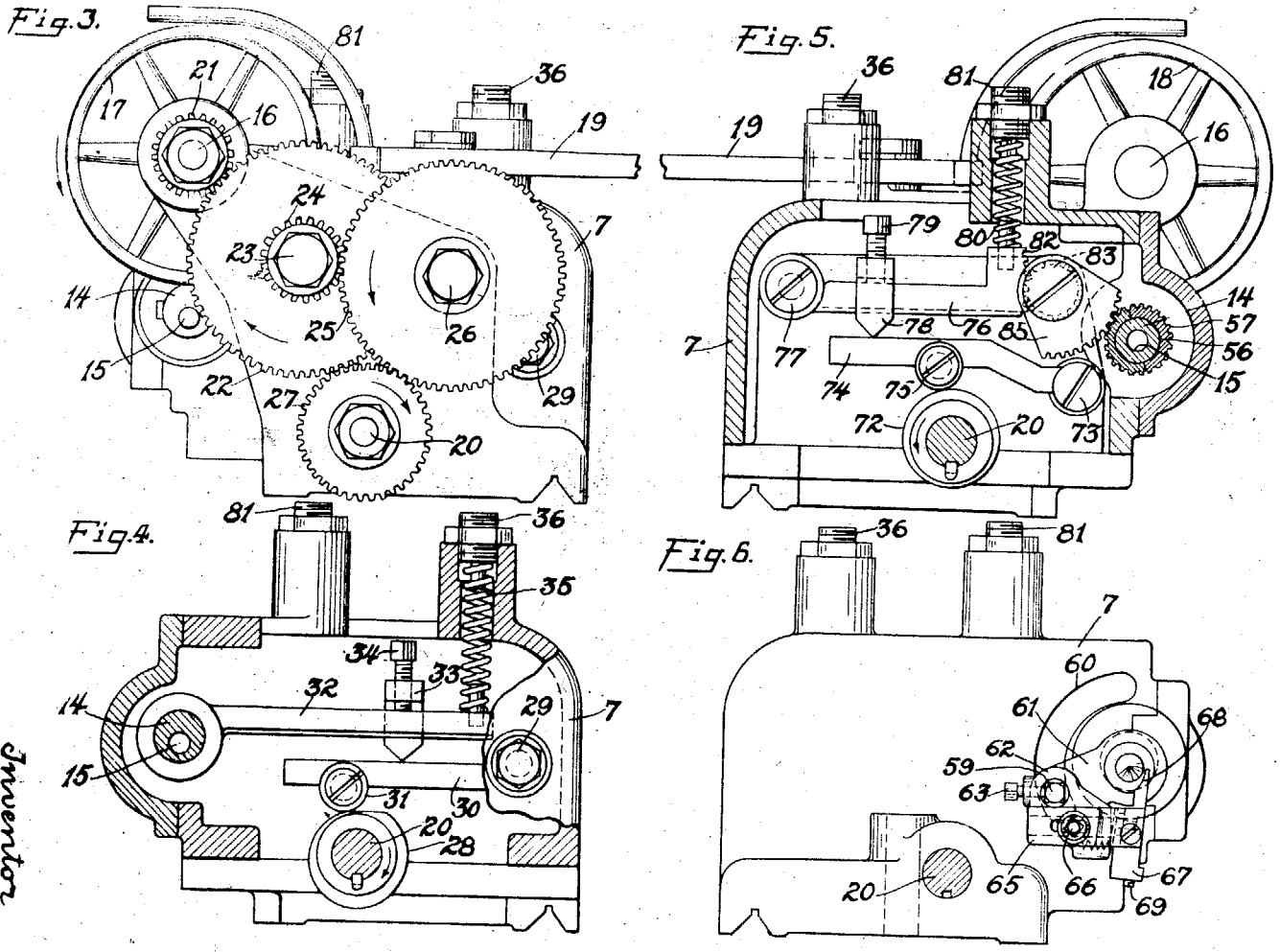
Inventor
Friederich Müller
By Joseph H. Schofield
Attorney June 16, 1925.
Re. 16,098
F. MÜLLER
GRINDING MACHINE AND METHOD OF GRINDING
Original Filed Jan. 27, 1917 10 Sheets-Sheet 4
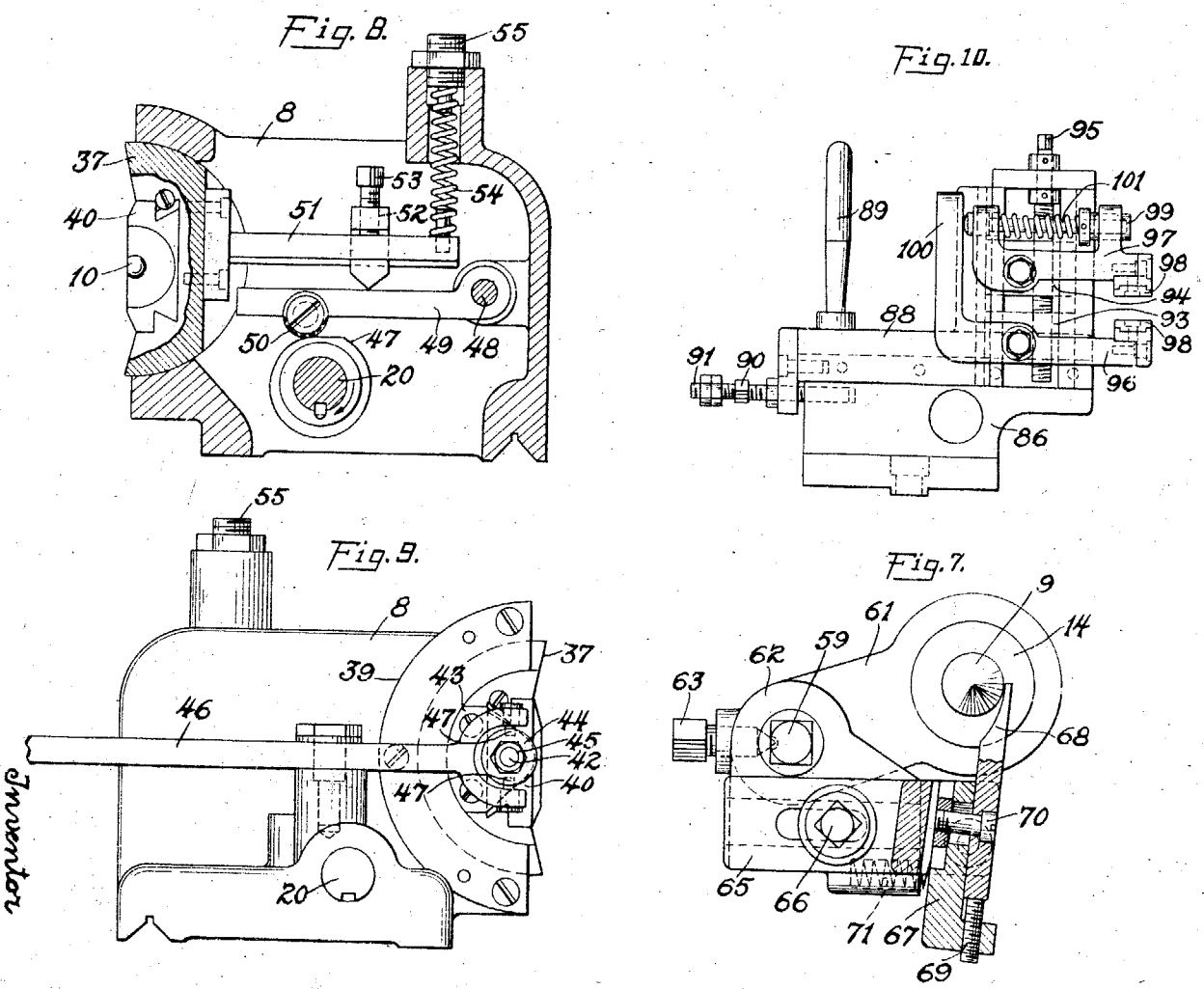
Inventor
Friederich Müller
By Joseph K. Schofield
Attorney June 16, 1925. Re. 16,098
F. MÜLLER
GRINDING MACHINE AND METHOD OF GRINDING
Original Filed Jan. 27, 1917 10 Sheets-Sheet 5
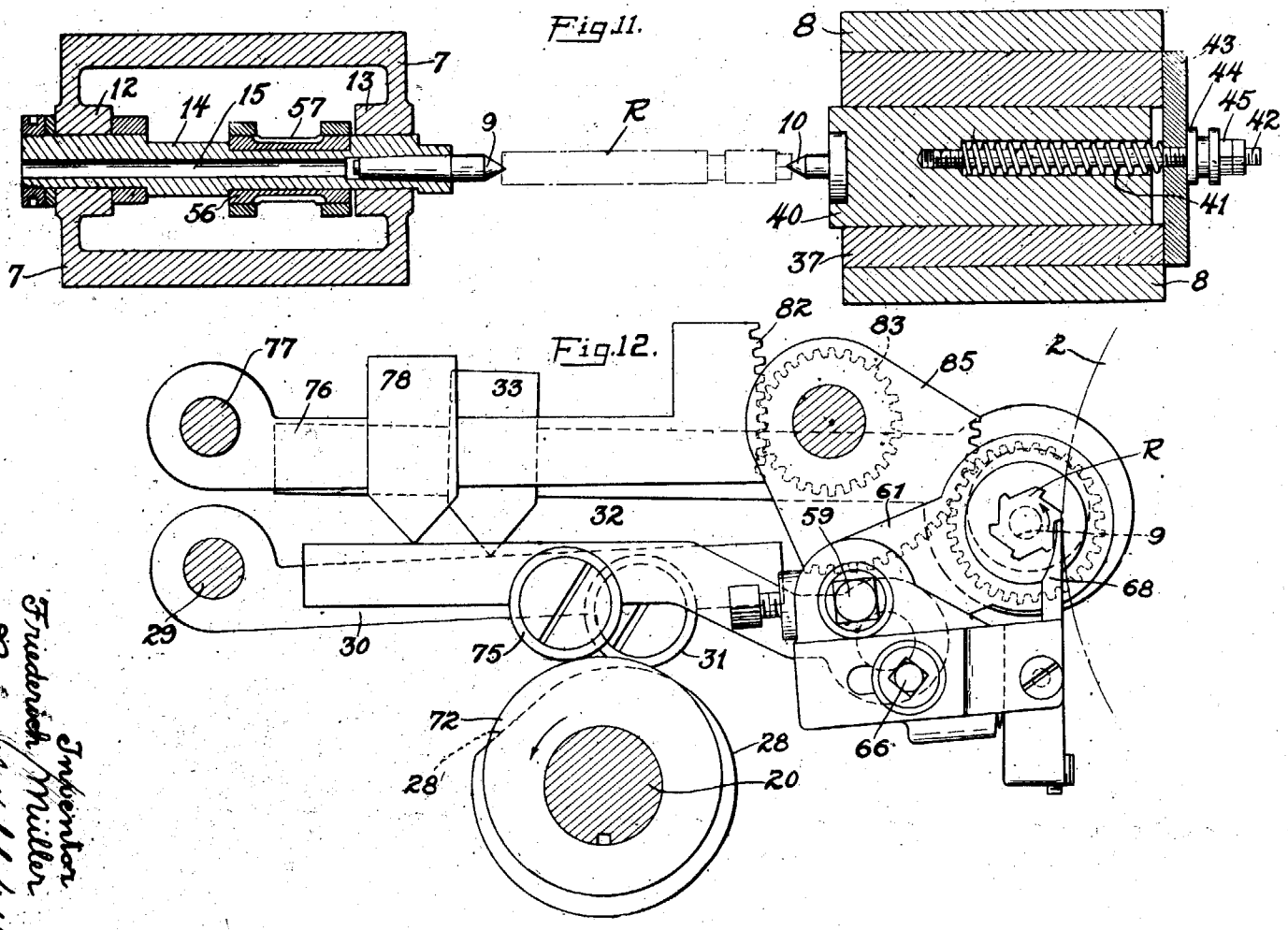
Inventor
Friederich Müller
By Joseph N. Schofield
Attorney June 16, 1925. Re. 16,098
F. MÜLLER
GRINDING MACHINE AND METHOD OF GRINDING
Original Filed Jan. 27, 1917 10 Sheets-Sheet 6
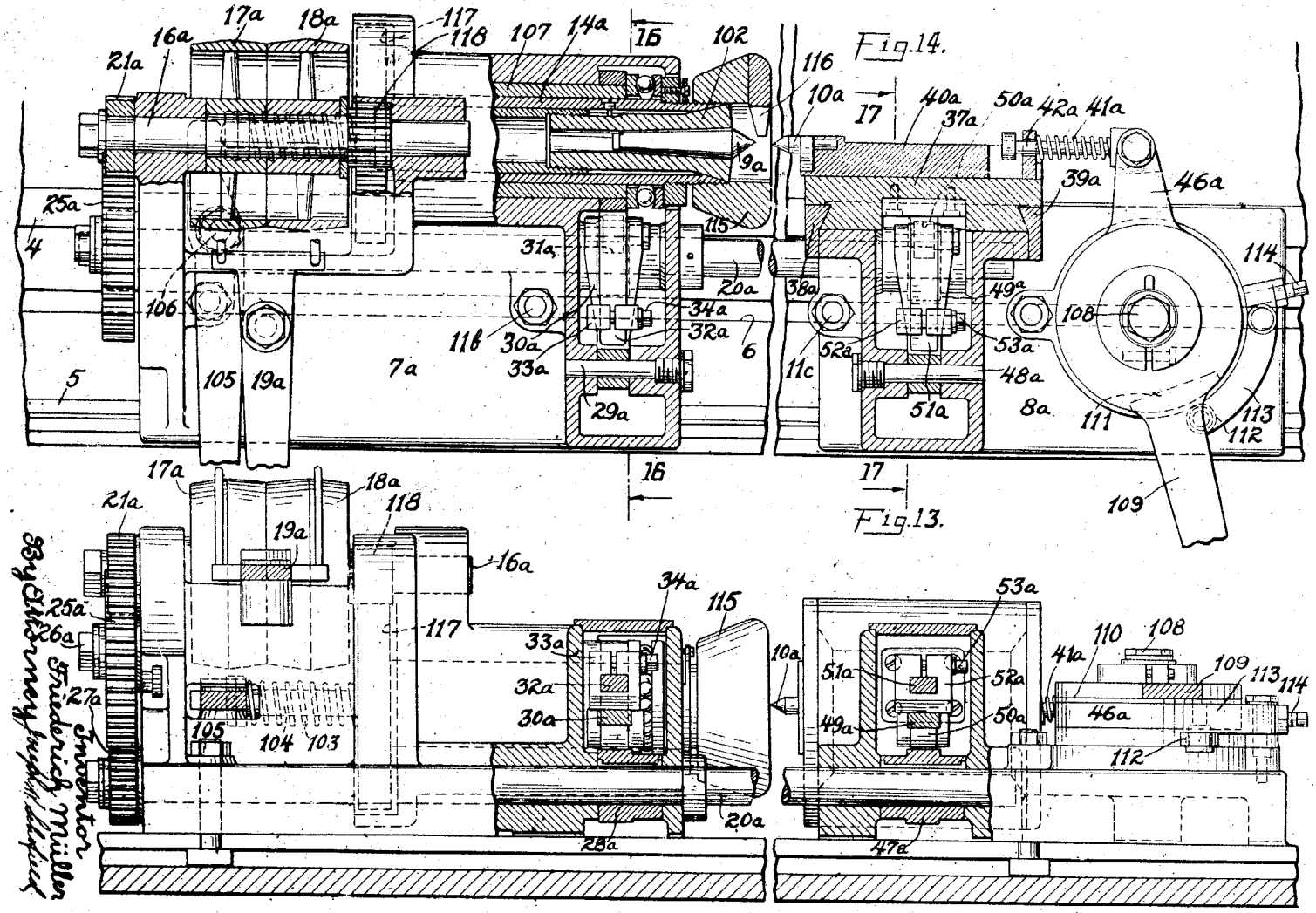

June 16, 1925. Re. 16,098
F. MÜLLER
GRINDING MACHINE AND METHOD OF GRINDING
Original Filed Jan. 27, 1917 10 Sheets-Sheet 7
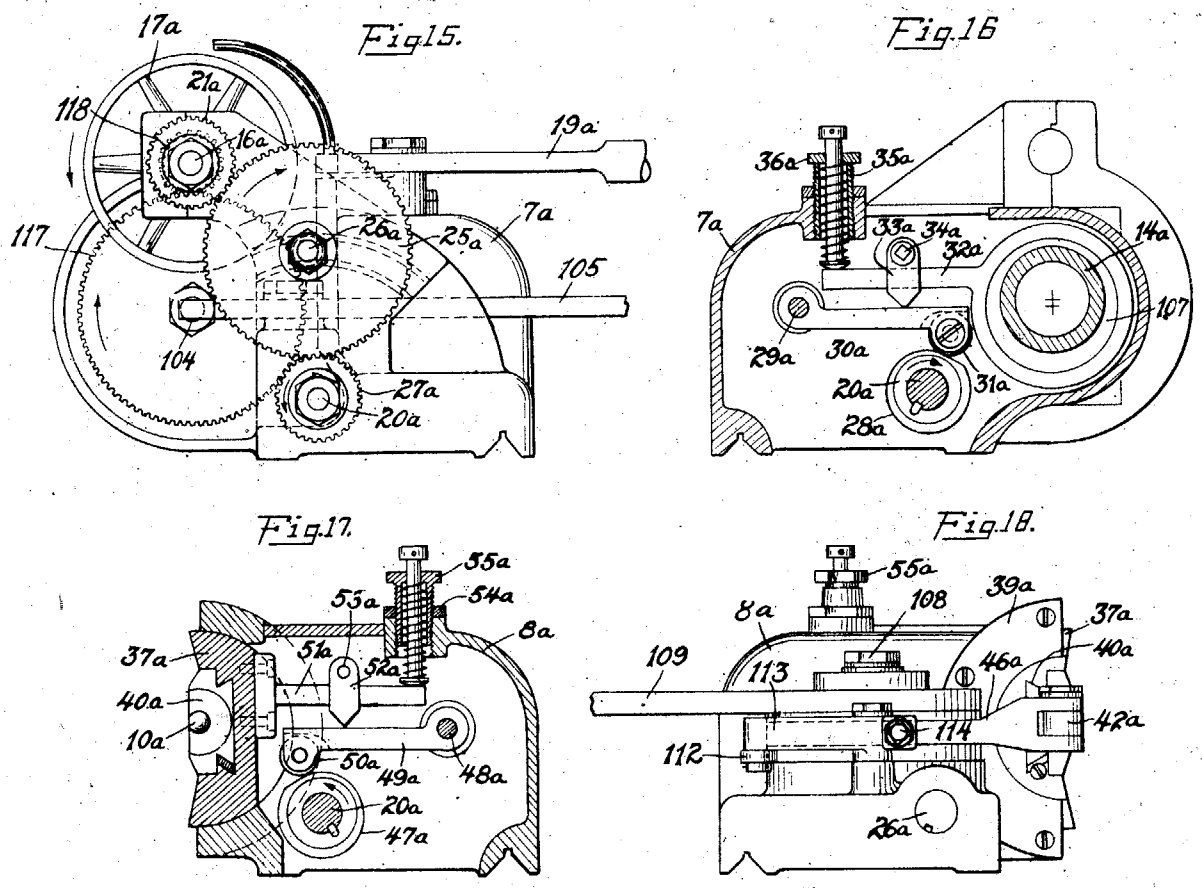
Inventor
Friederich Müller
By Joseph H. Schofield
Attorney June 16, 1925. Re. 16,098

F. MÜLLER

GRINDING MACHINE AND METHOD OF GRINDING

Original Filed Jan. 27, 1917 10 Sheets-Sheet 8

Inventor
Friederich Müller
By Joseph K. Schofield
Attorney

June 16, 1925. Re. 16,098
F. MÜLLER
GRINDING MACHINE AND METHOD OF GRINDING
Original Filed Jan. 27, 1917 10 Sheets-Sheet 9
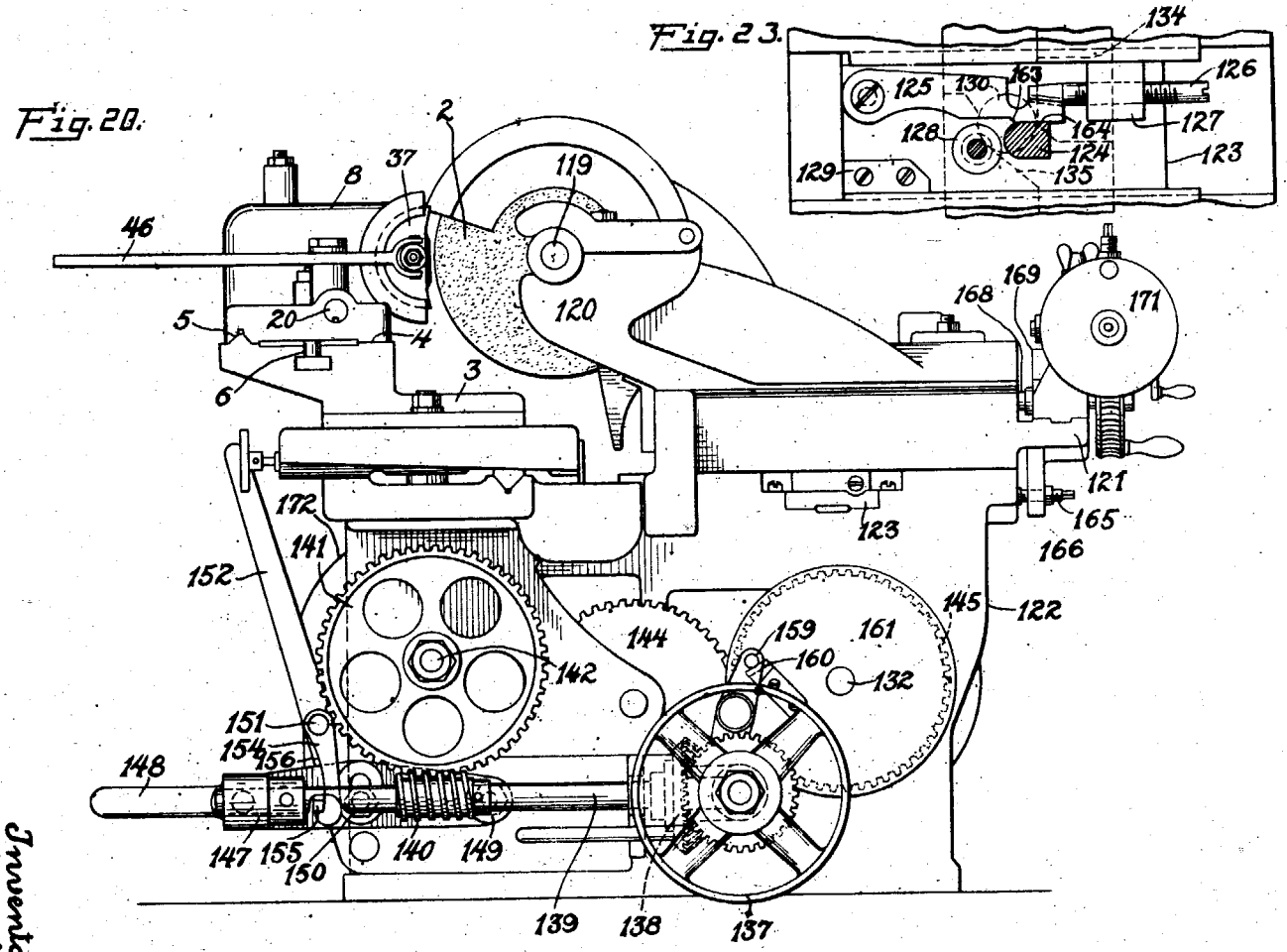
Inventor
Friederich Müller
By Joseph A. Schofield
Attorney June 16, 1925. Re. 16,098
F. MÜLLER
GRINDING MACHINE AND METHOD OF GRINDING
Original Filed Jan. 27, 1917 10 Sheets-Sheet 10
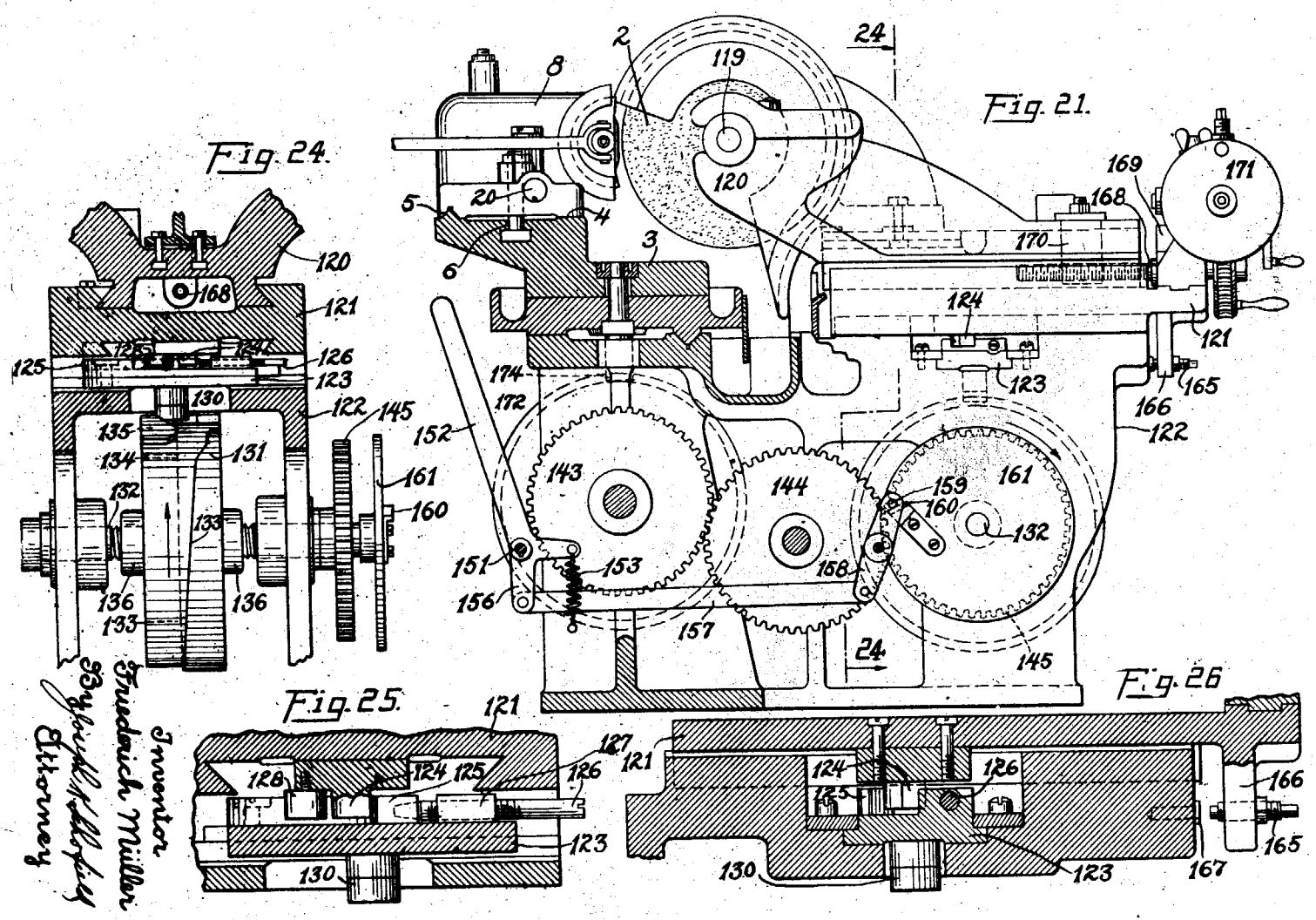

Reissued June 16, 1925.

Re. 16,098

UNITED STATES PATENT OFFICE.

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

GRINDING MACHINE AND METHOD OF GRINDING.

Original No. 1,365,337, dated January 11, 1921, Serial No. 144,923, filed January 27, 1917. Application for reissue filed October 19, 1921. Serial No. 508,890.

*To all whom it may concern:*

Be it known that I, FRIEDERICH MÜLLER, a citizen of the United States, residing at Hartford, in the county of Hartford and State of Connecticut, have invented certain new and useful Improvements in Grinding Machines and Methods of Grinding, of which the following is a specification.

The invention relates particularly to metal working machines or attachments therefor adapted for finishing and relieving the flutes or teeth of reamers or other similar metal working tools. The invention is particularly useful when applied to machines provided with grinding wheels, but as concerns some of the less specific features, it can be used in connection with machines provided with other metal reducing means such as cutting tools. It will appear, however, from the following specification that the invention, as concerns some of its more specific features, is adapted only for grinding machines.

The invention also relates to an improved method of grinding reamers and similar tools.

Throughout the specification reference will be had to a "grinding machine" and a "grinding wheel," but in many cases these terms are used simply for convenience and for brevity of expression and are intended to include other metal reducing means as set forth above. Also throughout the specification the term "reamer" will be used, but it will be understood that the term is used generically and is intended to include other metal working tools having teeth or flutes adapted to be relieved, particularly by grinding.

One of the objects of the invention is to provide a mechanism for presenting the teeth of a reamer to a grinding wheel in rapid succession for relieving, the wheel engaging each tooth along its entire length. The desired relief is most advantageously effected by reciprocating the reamer toward and from the wheel while it is being turned to present the successive teeth. Preferably a relative feeding is effected between the reamer and the wheel during grinding to cause them to approach each other until the teeth have been reduced to the desired form and size.

A further object of the invention is to provide improved mechanism whereby the amount of relief can be changed as required.

A further object of the invention is to provide improved means for turning or rotating the reamer, the said means being adapted to present a different tooth to the grinding wheel at each reciprocation notwithstanding variations in the spacing of the teeth.

Another object of the invention is to provide numerous improved structural features adapted for carrying out the purposes already set forth.

Another object of the invention is to provide an attachment for a grinding machine, the attachment being adapted to co-operate with the grinding wheel and other parts of a previously or separately constructed machine to accomplish the results above set forth.

Another object of the invention is to provide an improved method of grinding a reamer, whereby all of the teeth are relieved and finished from end to end substantially simultaneously.

Still further objects of the invention will be apparent from the following specification and the claims.

I have shown two different mechanisms each embodying certain of the structural features of my invention and each adapted for carrying out my improved method, but it is to be understood that the structural features of my invention can be embodied in mechanisms different from those shown and that the improved method can be followed by the use of other and different mechanisms. The invention is particularly applicable to a grinding machine of the type shown and described in my reissued Patent No. 13,930 for grinding machines, dated June 15th, 1915, and a similar machine is illustrated in the drawings. It will be understood that the drawings are for illustrative purposes only and are not to be considered as defining or limiting the scope of the invention, the accompanying claims being relied upon for that purpose.

Of the drawings:

Fig. 3 is an end view of the headstock shown in Figs. 1 and 2, this view being taken from the left.

Fig. 4 is a transverse vertical sectional view taken along the line 4—4 of Fig. 2.

Fig. 5 is a transverse vertical sectional view taken along the line 5—5 of Fig. 2.

Fig. 6 is an end view of the headstock taken from the right.

Fig. 7 is an enlarged detail view of a part of the mechanism for turning the reamer.

Fig. 8 is a transverse sectional view of the tailstock taken along the line 8—8 of Fig. 2.

Fig. 9 is an end view of the tailstock, the view being taken from the right.

Fig. 10 is an end view of the reamer clamping device, the view being taken from the right.

Fig. 11 is a fragmentary vertical sectional view taken along the longitudinal center line of the mechanism.

Fig. 12 is a diagrammatic view showing the principal element of the reamer actuating mechanism.

Fig. 13 is a vertical longitudinal view similar to Fig. 1 but showing another embodiment of the invention, the mechanism shown being adapted to be substituted for the mechanism shown in Figs. 1 to 12.

Fig. 14 is a horizontal sectional view of the mechanism shown in Fig. 13.

Fig. 15 is an end view of the headstock shown in Figs. 13 and 14, the view being taken from the left.

Fig. 16 is a transverse vertical sectional view taken along the line 16—16 of Fig. 14.

Fig. 17 is a transverse vertical sectional view of the tailstock taken along the line 17—17 of Fig. 14.

Fig. 18 is an end view of the tailstock, this view being taken from the right.

Fig. 19 is a plan view (with parts removed) of a complete grinding mechanism embodying the invention.

Fig. 20 is an end view taken from the right.

Fig. 21 is a combined sectional and end view taken along the line 21—21 of Fig. 19.

Figs. 22 and 23 are detail views showing in different positions the essential parts of the mechanism for controlling the position of the carriage supporting the grinding wheel.

Fig. 24 is a fragmentary sectional view taken along the line 24—24 of Fig. 21.

Fig. 25 is a fragmentary sectional view taken along the line 25—25 of Fig. 19, some of the parts being shown in elevation.

Fig. 26 is a fragmentary sectional view taken along the line 26—26 of Fig. 19, some of the parts being shown in elevation.

Figure 1:
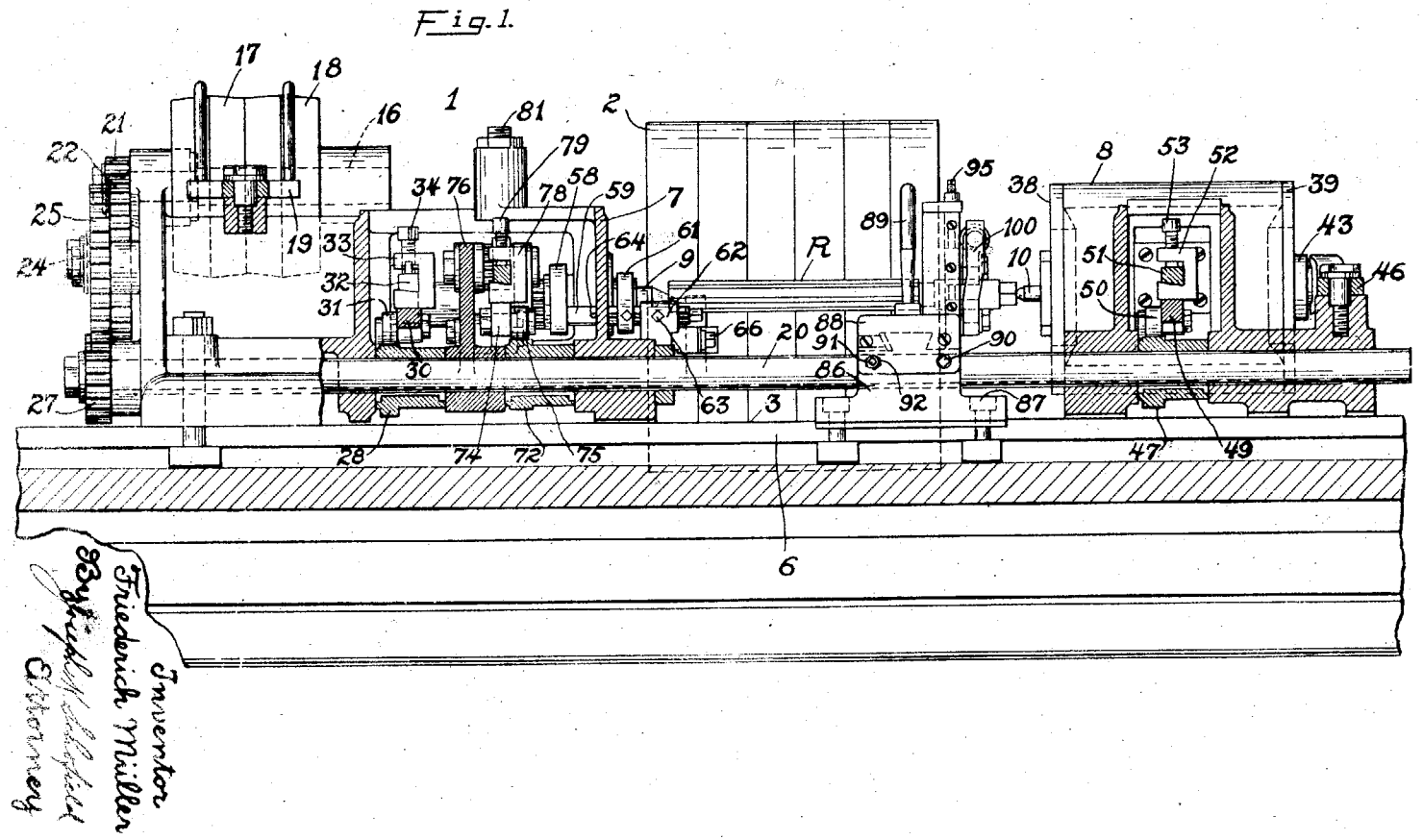
Figure 1 is a vertical longitudinal sectional view of a mechanism embodying many of the features of the invention.

Referring to the drawings, 1 represents as a whole a reamer holding and actuating mechanism adapted to co-operate with a grinding wheel 2. The mechanism 1 may be and preferably is constructed as an attachment adapted to be applied to a grinding machine previously or separately constructed and without such attachment not adapted for the grinding of reamers or other tools. It will be understood, however, that my invention is not limited to a separate attachment, and that when preferred the entire machine may be built as one permanent mechanism.

So far as illustrated in Figs. 1 to 12 the grinding machine comprises, in addition to the wheel 2, a bed 3 having longitudinal ways 4 and 5 and a longitudinal T-slot 6. The reamer holding and actuating mechanism comprises a headstock 7 and a tailstock 8 and preferably other devices mounted upon or adapted to be mounted upon the bed.

The headstock 7 and the tailstock 8 are provided respectively with centers 9 and 10 adapted to engage the respective ends of a reamer R. The headstock and tailstock are preferably adjustable along the ways 4 and 5 of the bed 3 in order to accommodate reamers of different lengths. Suitable means such as bolts 11 and 11[a] entering the T-slot 6 are provided for holding them in adjusted positions.

The machine is so constructed that relative reciprocation of the reamer holding devices and the grinding wheel toward and away from each other can be effected, this reciprocation being of the proper amplitude to effect the desired relief of the reamer teeth. So far as certain of the broader features of the invention are concerned, it is immaterial whether the grinding wheel be reciprocated toward or from the reamer, or the reamer reciprocated toward and from the grinding wheel; but in order to carry out some of the more specific purposes of the invention it is necessary to reciprocate the reamer toward and from the wheel. The provision of means for reciprocating the reamer is especially important when the invention is embodied as an attachment for a machine not otherwise adapted for relieving.

The reciprocation of the reamer is effected by moving the centers 9 and 10, the movement preferably being an oscillatory one about an eccentric longitudinal axis. Means are provided for oscillating both of the centers in unison, and reference will first be had to the mechanism for oscillating the center 9 of the headstock.

Mounted in suitable bearings 12 and 13 in the main frame casting of the headstock is a spindle 14, this spindle being provided with a longitudinal eccentric aperture 15 the forward end of which is tapered to receive the center 9. Preferably the axis of the aperture is normally approximately in the same vertical plane as the axis of the spindle, and it is shown as being below the axis of the spindle. See Figures 3 and 4.

Also mounted in suitable bearings in the headstock casting is a drive shaft 16 on which are mounted tight and loose belt pulleys 17 and 18. For shifting the belt from one to the other of these pulleys there is provided a manually operable shifting lever 19.

A longitudinal rotatable shaft 20 is mounted in suitable bearings near the bottom of the headstock casting. At the end of the headstock there is provided a train of gearing for connecting the drive shaft 16 and the shaft 20. As shown, this train of gearing comprises a pinion 21 mounted on the shaft 16 and meshing with a gear 22 mounted on a stud 23 carried by the headstock casting. Secured to the gear 22 is a pinion 24 which meshes with an idler gear 25 on a stud 26 also carried by the headstock casting. The idler gear 25 meshes with a gear 27 secured to the shaft 20. By means of this train of gearing the shaft 20 is rotated at a speed considerably less than that of the shaft 16.

Keyed to the shaft 20 is a collar or bushing provided with a cam 28. Pivoted to the headstock casting at 29 is a lever 30 provided with a roller 31 positioned to engage the cam 28. Secured to the spindle 14 is a lever 32 positioned above the lever 30. Carried by the lever 32 is a lug 33 which is V-shaped at its bottom and which engages the lever 30. The lug 33 is adjustable longitudinally of the lever 32 and can be secured in adjusted position by means of a set screw 34. A coil spring 35 presses downward upon the lever 32 thus serving to hold the lug 33 firmly in engagement with the lever 30. The upper end of the spring abuts against a screw 36 which can be adjusted to change the spring pressure.

It will be seen that as the shaft 20 and the cam 28 are rotated, the lever 30 will be oscillated about its pivot, and by means of the lug 33 will transmit an oscillatory movement to the lever 32 and the spindle 14. The extent of the oscillatory movement can be changed by moving the lug 33. It will be seen that when the lug is moved to the right as viewed in Fig. 4, it engages a point on the lever 30 where the vertical movement is less, and at the same time the effective length of the lever 32 is increased, thus still further decreasing the amplitude of oscillation. When the lug is moved to the left the opposite results are obtained and the amplitude of oscillation is increased. Because of the eccentricity of mounting of the center 9 the oscillation brought about in the way described causes the center to oscillate about the spindle axis, thus effecting a reciprocation toward and from the grinding wheel.

As shown in Fig. 4, the roller 31 is in engagement with the lowest part of the cam 28. In this position the levers 30 and 32 are parallel and the axis of the aperture 15 and of the center 9 is directly below the axis of the spindle 14. The axis of the center is in its outermost position and any movement thereof must be toward the right or away from the grinding wheel. It will be clear that because of the fact that the levers 30 and 32 are parallel for this position, the lug 33 can be adjusted to change the amplitude of oscillation without changing the outermost position of the axis of the center.

The center 10 of the tailstock is carried by an oscillatory spindle which is preferably in the form of a segment 37. The segment 37 is mounted upon the main tailstock casting which is provided with a semi-cylindrical recess adapted to receive it. The segment is provided at its ends with semi-circular undercut rabbets and semi-circular gibs 38 and 39 are secured to the tailstock casting, fitting the rabbets and holding the segment in place without interfering with oscillatory movement. Preferably, as shown in Fig. 8, the segment 37 extends through only a little more than 180°, thus leaving the space beyond the axis substantially unobstructed and adapted to be occupied by the grinding wheel when necessary.

The center 10 is preferably connected with the oscillatory segment 37 by means of a slide 40 to which the center is rigidly secured. The center is eccentrically positioned with respect to the axis of the segment, the eccentricity being the same in extent and position as the eccentricity of the center 9 with respect to the axis of the spindle 14. The slide is longitudinally movable with respect to the segment, and means are provided for applying a predeterminedly limited pressure to the slide to move it. As shown, the movement of the slide toward the tailstock is effected by a coil spring 41, and in the other direction by a rod 42 which extends through the spring. One end of the spring abuts against a stop 43 secured to the segment 87, and the rod 42 extends through an aperture in this stop. Mounted on the rod 42 is a grooved collar 44, the position of which is adjustable by means of lock nuts 45. Normally the slide is moved toward the left by means of the spring, the extent of movement being limited by the rod 42 and the collar 44. Pivoted on the tailstock casting is a manually operable lever 46 provided with pins 47, 47 engaging the groove of the collar 44. By means of the lever 46 which acts through the collar 44 and the rod 42, the slide 40 can be drawn back against the pressure of the spring 41. In this way the center 10 can be withdrawn to release a reamer or other tool which may have been held between it and the centers 9 and to permit another reamer to be put in place. As soon as the lever 46 is released the spring 41 presses the center 10 against the reamer with a limited predetermined pressure.

For oscillating the segment 37 there is provided a mechanism similar to that provided for oscillating the spindle 14. The shaft 20 is extended to engage suitable bearings in the tailstock casting. Connected with the shaft is a collar or bushing provided with a cam 47. This cam bushing is splined to the shaft so as to permit the tailstock to be adjusted longitudinally with respect to the headstock. Pivoted to the tailstock casting at 48 is a lever 49 provided with a roller 50 engaging the cam 47. Secured to the segment 37 is a lever 51 which carries a lug 52 V-shaped at its bottom and engaging the lever 49. The lug is adjustable longitudinally of the lever and can be held in adjusted position by means of the set screw 53. A spring 54 presses downward upon the lever 51, the pressure of the spring being adjustable by means of the screw 55. It will be seen that by means of this mechanism the segment 37 will be oscillated as the shaft 20 and the cam 47 are rotated, the extent of oscillation being adjustable by changing the position of the lug 52.

As shown in Fig. 8 the roller 50 is in engagement with the lowest part of the cam 47. In this position the levers 49 and 51 are parallel and the axis of the center 10 is directly below the axis of the segment 37. The axis of the center is in its outermost position and any movement thereof must be toward the right or away from the grinding wheel. It will be clear that because of the fact that the levers 49 and 51 are parallel for this position the lug 52 can be adjusted to change the amplitude of oscillation without changing the outermost position of the axis of the center.

Figure 2:
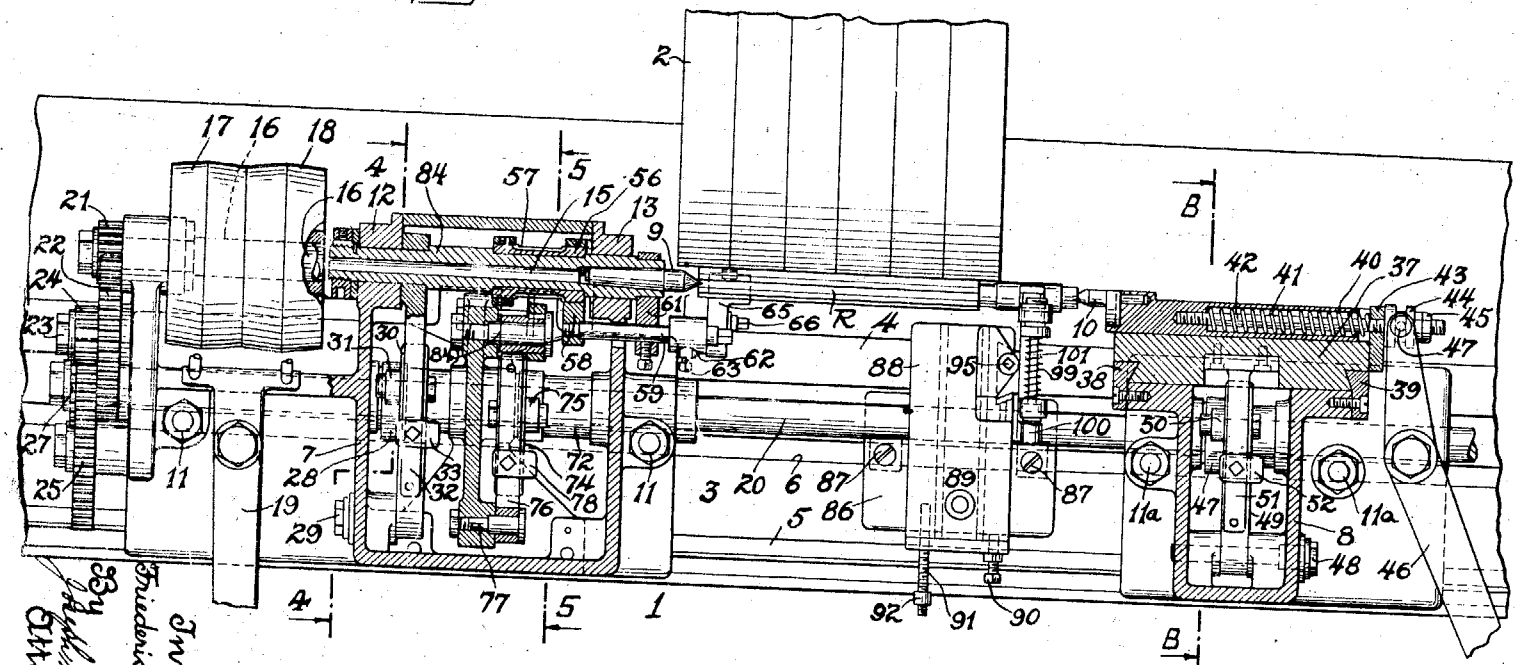
Fig. 2 is a horizontal sectional view of the mechanism shown in Fig. 1.

The levers 49 and 51 are respectively similar in length and position to the levers 30 and 32 and the two cams 28 and 47 are similar in shape and in position on the shaft 20. Therefore when the lugs 33 and 52 are similarly positioned the two centers 9 and 10 are oscillated in unison and to the same extent. Preferably as indicated in Fig. 2 suitable marks are provided on the levers 32 and 51 so that the two lugs 33 and 52 can be readily positioned so as to obtain the same amplitude of oscillation for the two centers.

Mechanism is provided for engaging a reamer mounted on the centers and for turning it in such a way that successive teeth are presented for grinding at successive movements or oscillations of the reamer toward the grinding wheel. The turning may be either continuous or intermittent. If the reamer to be ground has its teeth uniformly spaced, then the turning may be not only continuous but at a uniform rate. However, if the teeth of the reamer are unevenly spaced, it is necessary to vary the rate of turning in such a way as to compensate for the uneven spacing. Obviously, whether the turning be continuous or intermittent or at a uniform or a variable rate, it is necessary in order to effect a relieving of the teeth to turn the reamer simultaneously with and in definite relation to its movement toward or away from the grinding wheel.

I prefer to effect the turning intermittently and in order that the machine may be capable of grinding reamers having their teeth unevenly spaced, I prefer to provide a turning mechanism as shown in Figs. 1, 2, 5, 6 and 7. Rotatively mounted on the spindle 14 concentrically with the center 9 and eccentrically of the bearings 12 and 13, is a sleeve or bushing 56 provided at 57 with gear teeth. Secured to the sleeve 56 is an arm 58 carrying a pin 59 which extends parallelly with the spindle 14 and projects through an arcuate slot 60 in the wall of the headstock. Preferably there is provided a supplemental arm 61 also engaging the pin 59 and having a bearing on the spindle concentric with the center. Secured to the pin 59 is a bracket 62, this bracket preferably being adjustable along the pin and held in place by a set screw 63 engaging a groove 64 in the pin. Connected with the bracket 62 is a slide 65 (see Fig 7) adjustable horizontally toward and away from the vertical plane of the spindle axis. By means of a bolt 66 the slide can be secured to the bracket in any desired position. The forward end of the slide 65 is forked and between the forks there is pivoted a block 67 carrying a pawl 68. The pawl is adjustable upward or downward with respect to the block by means of the screw 69 and can be held in adjusted position by means of the screw 70. A spring 71 is interposed between the slide and the block, serving to press the lower end of the block forward and to swing the upper end of the pawl inward toward the axis of the center. The pawl 68 is adapted to engage one of the teeth of a reamer (see Fig. 12), and when the sleeve 56 and the parts carried thereby including the pawl, are turned in the direction of the arrow, the reamer is turned or advanced. After a predetermined amount of turning the sleeve 56 and the parts carried thereby are turned in the other direction, the pawl 68 slipping over the next tooth of the reamer and dropping in behind it.

For oscillating the sleeve 56 the following mechanism is provided. Mounted upon the shaft 20 is a sleeve or bushing provided with a cam 72. Pivoted to the headstock casting at 73 is a lever 74 provided with a roller 75 engaging the cam 72. A lever 76 is positioned above the lever 74, being pivoted to the headstock casting at 77. A lug 78 is secured to the lever 76, this being V-shaped at its lower end and engaging the upper surface of the lever 74. The lug is adjustable along the lever and can be held in place by means of a set screw 79. A spring 80, adjustable by means of a screw 81, presses downward upon the lever 76. The end of the lever 76 is provided with a segmental gear 82 meshing with a pinion 83 rotatable upon a pin 84 mounted in the headstock casting. Connected with the pinion 83 is a segmental gear 85 meshing with the teeth 57 of the sleeve 56. It will be seen that by the mechanism described an oscillatory movement is transmitted to the sleeve 56 and to the parts carried thereby when the shaft 20 and the cam 72 are rotated.

The cam 72 is so shaped and so positioned with respect to the cams 28 and 47 that the movement of the pawl 68 in the direction to advance the reamer is completed when the reamer is moving away from the grinding wheel. This will be apparent from an inspection of the diagrammatic view in Fig. 12, it being understood that the cam 47 and the parts operable thereby are movable in unison with the cam 28 and the parts driven thereby (which are illustrated). The roller 31 is in engagement with an intermediate part of the cam 28 and is being pushed upward, and the roller 75 is in engagement with the highest part of the cam 72. The cam 72 in rotating to its present position has moved the roller 75 upward, and has caused the pawl 68 to rotate the reamer in the direction of the arrow. The cam 28 in rotating to its present position has moved the roller 31 upward, thus turning the spindle 14 in the clockwise direction and bodily moving the reamer away from the grinding wheel. In this way the reamer has been turned and at the same time moved away from the wheel, the tooth adjacent the wheel being ground with the proper relief. Further rotation of the cam 28 moves the reamer entirely out of engagement with the wheel, thus preventing any possible improper grinding thereof. As the cam 72 continues to rotate the roller 75 is permitted to move downward under the influence of gravity and of the spring 80, thus moving the pawl 68 in the clockwise direction and causing it to take a position back of the next reamer tooth. During the subsequent movement of the reamer in the direction of the arrow the roller 31 is permitted by the sharply inclined section 28 of the cam 28 to move quickly downward and swing the reamer outward so as to be ready for the grinding of the next tooth.

By changing the position of the lug 78 the amplitude of oscillation of the pawl 68 can be changed as already described. The amplitude of oscillation may be varied to correspond approximately with the spacing of the reamer teeth, and in any case the adjustment must be such that the pawl moves backward a little beyond the next tooth to make sure of engagement therewith. When the reamer teeth are unevenly spaced the amplitude of oscillation must be adjusted for the maximum distance between any two adjacent teeth. The pawl 68 is so adjusted with respect to the block 67 that at the end of its movement forward and upward its upper end lies in a horizontal plane passing through the axis of the grinding wheel and the axis of the reamer. This position is reached when the roller 75 is on the highest part of the cam 72, the levers 74 and 76 being parallel. Therefore the extent of forward movement of the cam is not affected in any way by the adjustment of the lug 78 to change the amplitude of oscillation.

It is desirable to provide for changing the amount of relief as may be required for different classes of work. Heretofore in the case of eccentrically mounted oscillating centers the amount of relief has been changed by changing the eccentricity. In accordance with my invention the mechanism is greatly simplified by providing oscillating centers having their eccentricity fixed, and by providing other means for changing the amount of relief. When the rate or the manner of turning is fixed or predetermined, the amount of relief can be changed by changing the amplitude of oscillation. In the present construction this is effected by changing the positions of the lugs 33 and 52, as already described. For a given speed of the shaft 20 the time required for each complete cycle of oscillation is fixed and therefore, when the rate of turning is fixed as above stated, there will be a definite amount of turning for each cycle of oscillations. By changing the amplitude the amount of movement of the reamer toward or from the grinding wheel for a given amount of turning can be changed, thus changing the amount of relief.

If desired the amount of relief can also be changed by changing the rate of turning without changing the amplitude of oscillation. With the amplitude of oscillation fixed the amount of movement toward or from the grinding wheel is fixed, and if the amount of turning during such movement be changed, the amount of relief will be changed. If the rate of turning be rapid the angle of relief is small, and if the rate of turning be slow then the angle of relief is large. In the present construction the rate of turning may be changed by changing the amplitude of oscillation of the pawl 68. For a given speed to the shaft 20 the time required for each complete cycle of oscillation of the pawl is fixed and therefore the angular speed is increased or decreased as the amplitude is increased or decreased.

In using the machine as so far described and in following the method constituting a part of my invention, the headstock 7 and tailstock 8 are adjusted on the bed 3 to position the centers 9 and 10 at the correct distance from each other to properly engage reamers of the length to be ground and to bring the teeth of the reamers opposite the grinding wheel 2. Then the center 10 is drawn back by means of the lever 46 and a reamer is put in place. The lever is released and the center 10 is pressed against the reamer by the spring 41. Care is taken in preliminarily adjusting the headstock and tailstock and in putting the reamer in place to see that the teeth face downward at the rear so as to be properly engaged by the pawl 68. For a right-hand reamer the shank must engage the center 10 and for a left-hand reamer the shank must engage the center 9.

After the reamer is properly engaged by the centers the drive belt is shifted to the pulley 17. The pawl 68 then acts to turn the reamer intermittently tooth by tooth and each tooth is ground as it is presented to the grinding wheel. As already stated, the reamer is at the position farthest away from the wheel when the pawl is in its upper position as shown in Fig. 12, thus causing the edge of the tooth engaged by the pawl to be higher than any other part of the tooth. During retrograde movement of the pawl the reamer is moved a little further away from the grinding wheel to insure clearance. When the pawl has engaged the next tooth and has started to turn it, the reamer is caused to move quickly toward the grinding wheel, the wheel entering the space between the two teeth. As the turning movement of the reamer continues the reamer is again moved away from the wheel at a speed so related to the speed of turning as to effect the grinding of the tooth with the proper convex relief surface. It will be seen that each tooth engages the grinding wheel but once for each revolution of the reamer, successive teeth being presented for grinding at successive oscillations. After the grinding has been completed, the center 10 can be withdrawn to release the reamer and another reamer to be ground can be put in place.

Inasmuch as the turning of the reamer is effected by engagement with the reamer teeth, it will be clear that the turning will be properly effected even though the teeth may be unevenly spaced. It is only necessary to so adjust the parts that the throw of the pawl is at least as great as the greatest distance between any two adjacent teeth. For teeth that are more closely spaced the pawl will have more lost motion but will engage the teeth at the proper instants and advance them. This feeding mechanism is highly advantageous even for reamers having teeth which are supposedly uniformly spaced. In the initial grooving of the reamers to form the teeth, an indexing mechanism of some sort must be provided, and even with a very accurate indexing mechanism minor errors are likely to arise. It will be seen that my improved mechanism automatically compensates for such errors as may have arisen in the initial formation of the teeth, all of the teeth being accurately ground and with their cutting edges at the same distance from the center.

Under some circumstances there is a tendency for the reamer to move backward with the pawl 68 when the pawl is moved backward to engage the next tooth. In order to prevent this and to hold the reamer stationary as concerns rotary movement during the backward movement of the pawl, I prefer to provide a mechanism for engaging the reamer, this mechanism preferably acting frictionally. As shown in Figs. 1, 2 and 10, there is provided a bracket 86 resting upon the bed 3 and adjustably secured thereto by means of the bolts 87 entering the T-slot 6. This bracket is provided with an aperture through which the shaft 20 extends. Mounted on the bracket 86 is a transversely movable horizontal slide 88. This slide is provided with a handle 89 by means of which it may be moved, the amount of movement being adjustably limited by means of the screw 90 secured to the slide and the bolt 91 secured to the bracket and having stop nuts at 92. The horizontal slide 88 is provided with vertical ways in which are mounted two vertical slides or blocks 93 and 94, these slides being controllable by the oppositely threaded screw 95. When the screw is turned in one direction the slides will be moved away from each other and when the screw is moved in the other direction the slides will be moved toward each other. The two slides are at all times equidistant from a common center line. Pivoted to the vertical slide 93 is a horizontal lever 96, and pivoted to the vertical slide 94 is a horizontal lever 97. At the forward ends of these levers are friction pads 98. Slidably mounted in lugs on the lever 97 is a push rod 99 engaging an arm 100 extending vertically from the lever 96. A spring 101 surrounds the rod 99 and serves to press it outward against the arm 100, thus tending to force toward each other the ends of the levers carrying the friction pads.

In use, the bracket 86 is adjusted along the bed so as to be in position to engage the shank of the reamer being ground. While the reamer is being put into place the slide is drawn back manually and then when the reamer is engaged by the centers the slide is pressed forward, the friction pads springing apart to pass over the shank. The shank is gripped between the pads with sufficient force to prevent any accidental backward movement of the reamer, the force being insufficient, however, to interfere in any way with the normal advancing movement.

When it is required to grind only reamers having evenly spaced teeth, it is possible to make use of a mechanism somewhat simpler than that already described, but nevertheless similar in many respects. Such a mechanism is shown in Figs. 13 to 18. It will be understood that the construction shown in these figures is intended to be used alternately with the construction shown in Figs. 1 to 12, and that the other parts of the machine may be and preferably are the same as already briefly described. It will furthermore be understood that the mechanism shown in these figures may be constructed as an attachment for a previously or separately constructed machine, or if desired, may constitute a permanent part of a complete machine.

The mechanism comprises a headstock $7^a$ and a tailstock $8^a$ mounted upon or adapted to be mounted upon the bed 3 and held in place by means of bolts $11^b$ and $11^c$ entering the T-slot 6. Carried respectively by the headstock $7^a$ and the tailstock $8^a$ are centers $9^a$ and $10^a$. The center $9^a$ is mounted in a spindle $14^a$ by means of a collet 102 controlled by a spring 103 surrounding a rod 104. By means of a lever 105 pivoted at 106 the collet can be moved to the right in opposition to the spring to release the center.

A bushing 107 is rotatably mounted in the headstock casting and the central aperture of this bushing is formed eccentrically. The spindle $14^a$ is rotatably mounted in the eccentric aperture of the bushing. As shown in Fig. 16 the axis of the spindle is directly above the axis of the bushing.

Means are provided for oscillating the bushing 107 and in this way oscillating the axis of the spindle $14^a$ and of the center $9^a$. As shown, the oscillating means comprises the following mechanism: $16^a$ is a longitudinal drive shaft mounted in suitable bearings on the headstock casting. This drive shaft is provided with tight and loose belt pulleys $17^a$ and $18^a$. For shifting the belt on these pulleys there is provided a manually operable shifting lever $19^a$. Secured to the drive shaft is a pinion $21^a$ meshing with an idler gear $25^a$ mounted on a stud $26^a$. Gear $25^a$ meshes with a gear $27^a$ secured to a longitudinal shaft $20^a$ mounted in suitable bearings in the headstock casting. Preferably the pinion $21^a$ is interchangeable with other similar pinions having different numbers of teeth, the stud $26^a$ being adjustable to permit the gear $25^a$ to mesh with such differing pinions. In this way the speed of the shaft $20^a$ can be changed with respect to the speed of the drive shaft $16^a$. Secured to the shaft $20^a$ is a cam $28^a$. $30^a$ is a lever pivoted to the headstock casting at $29^a$ and provided with a roller $31^a$ engaging the cam $28^a$. A lever $32^a$ is positioned above the lever $30^a$ and is connected with the bushing 107. Adjustable along the lever $32^a$ is a lug $33^a$ adapted to be secured in adjusted position by means of the screw $34^a$. A spring $35^a$ presses downward on the lever $32^a$, the spring being adjustable by means of the threaded sleeve $36^a$. It will be seen that as the shaft $20^a$ is rotated the bushing 107 will be oscillated to a greater or less extent in accordance with the adjustment of the lug $33^a$.

As shown in Fig. 16 the roller $31^a$ is in engagement with the lowest part of the cam $28^a$ and the levers $30^a$ and $32^a$ are parallel. It is therefore possible to change the position of the lug $33^a$ without changing the relative position of the axis of the spindle $14^a$.

The center $10^a$ of the tailstock is carried by an oscillatory spindle which is preferably in the form of a segment $37^a$. The segment $37^a$ is mounted upon the main tailstock casting which is provided with a semi-cylindrical recess adapted to receive it. The segment is provided at its ends with semi-circular undercut rabbets and semi-circular gibs $38^a$ and $39^a$ secured to the tailstock casting and fitting the rabbets hold the segment in place without interfering with oscillatory movement. Preferably, as shown in Fig. 17, the segment $37^a$ extends through only a little more than 180°, thus leaving the space beyond the axis substantially unobstructed and adapted to be occupied by the grinding wheel when necessary.

The center $10^a$ is preferably connected with the oscillatory segment $37^a$ by means of a slide $40^a$ to which the center is rigidly secured. The center is eccentrically positioned with respect to the axis of the segment, the eccentricity being the same in extent and position as the eccentricity of the center $9^a$ with respect to the axis of the bushing 107. The slide is longitudinally movable with respect to the segment and is controlled by a lever $46^a$ pivoted to the tailstock casting at 108. Also mounted on the pivot 108 is a hand lever 109. Mounted between these two levers is a suitable friction element 110. Because of the frictional engagement between the two levers the hand lever 109 can be used to transmit power to move the center $10^a$ toward the headstock. As soon as the reamer is engaged, further movement of the lever $46^a$ is prevented and additional movement of the lever 109 causes a cam block 111 carried thereby to engage a roller 112 carried by a lever 113. At the other end of the lever is a screw 114, and when the lever is moved by the cam block 111 this screw is pressed against an annular surface on the lever $46^a$—thus locking the lever in adjusted position. Preferably the connection between the lever $46^a$ and the slide $40^a$ comprises a rod $42^a$ and a coil spring $41^a$. Frequently the grinding takes place at such a rapid rate that the reamer is heated, expansion taking place and tending to cause undue pressure and friction at the centers. The spring permits the center $10^a$ to move backward slightly to compensate for expansion.

For oscillating the segment $37^a$ there is provided a mechanism similar to that provided for oscillating the bushing 107. The shaft $20^a$ is extended to engage suitable bearings in the tailstock casting. Connected with the shaft is a collar or bushing provided with a cam $47^a$. This cam bushing is splined to the shaft so as to permit the tailstock to be adjusted longitudinally with respect to the headstock. Pivoted to the tailstock casting at $48^a$ is a lever $49^a$ provided with a roller $50^a$ engaging the cam $47^a$. Secured to the segment $37^a$ is a lever $51^a$ which carries a lug $52^a$ V-shaped at its bottom and engaging the lever $49^a$. The lug is adjustable longitudinally of the lever and can be held in adjusted position by means of a screw $53^a$. A spring $54^a$ presses downward upon the lever $51^a$, the pressure of the spring being adjustable by means of the threaded sleeve $55^a$. It will be seen that by means of this mechanism the segment $37^a$ will be oscillated as the shaft $20^a$ and the cam $47^a$ are rotated, the extent of oscillation being adjustable by changing the position of the lug $52^a$.

As shown in Fig. 17 the roller $50^a$ is in engagement with the lowest part of the cam $47^a$ and the levers $49^a$ and $51^a$ are parallel. It is therefore possible to change the position of the lug $52^a$ without changing the relative position of the axis of the segment $37^a$.

The levers $49^a$ and $51^a$ are respectively similar in length and position to the levers $30^a$ and $32^a$ and the two cams $28^a$ and $47^a$ are similar in shape and in position on the shaft $20^a$. Therefore when the lugs $33^a$ and $52^a$ are similarly positioned the two centers $9^a$ and $10^a$ are oscillated in unison and to the same extent. Preferably, as indicated in Fig. 14, suitable marks are provided on the levers $32^a$ and $51^a$ so that the two lugs $33^a$ and $52^a$ can be readily positioned so as to obtain the same amplitude of oscillation for the two centers.

Means are provided for rotating a reamer mounted on the centers $9^a$ and $10^a$ and in the present embodiment of the invention the reamer is rotated continuously at a uniform rate. The rotation of the reamer is effected by means of the spindle $14^a$. Secured to the end of the spindle is a driver 115 adapted to engage the shank of the reamer to turn it. The driver is provided with a finger 116 adapted to engage a groove or flat face of the reamer shank, but the form of the driver can be varied as required by the form of the shank.

Mounted on the opposite end of the spindle $14^a$ is a gear 117 meshing with a pinion 118 secured to the drive shaft $16^a$. It will be seen that by means of this gearing the spindle is continuously rotated, carrying the reamer with it. Obviously, the centers must be moved toward and from the grinding wheel and as many times during each revolution of the reamer as the reamer has teeth. It is for this reason that change-speed gearing is provided for driving the shaft $20^a$. By using the proper pinion at $21^a$ the speed of the shaft $20^a$ may be so determined as to oscillate or reciprocate the reamer the proper number of times.

The operation of the mechanism shown in Figures 13 to 18 is similar to that of the mechanism first described except that the reamer is turned continuously instead of intermittently. A detailed description of the operation is unncessary.

It has heretofore been customary to grind reamers by means of mechanisms which oscillated the reamers back and forth about its axis, each tooth being kept in contact with the grinding wheel until completely ground, and the wheel usually traveling longitudinally of the reamer. After one tooth was ground then the reamer was indexed and another tooth was ground. This method has the serious disadvantage that because of the wear of the grinding wheel, each tooth is slightly higher than the preceding one, the result being that there is an appreciable difference between the first tooth and the last tooth. In the effort to overcome this difficulty to some extent it has been common practice to grind each tooth twice, the first grinding being to reduce the tooth approximately to size and the second grinding being for the sake of finishing and to remove the inaccuracies in the first grinding arising from the wear of the wheel. Such a double grinding is obviously expensive, and furthermore only partially eliminates the inequalities of the teeth. In the use of my improved machine and in following my improved method, the several teeth are presented to the wheel in rapid succession, and any wear of the wheel affects all of the teeth uniformly.

It will be obvious, however, that when the teeth are presented to the wheel in rapid succession as stated, each tooth engaging the wheel but once during a complete revolution of the reamer, the grinding cannot ordinarily be finished during one revolution. Means must usually be provided for effecting a relative feeding or approaching movement between the wheel and the reamer to cause additional metal to be ground away on successive revolutions of the reamer. For this purpose I prefer to provide a mechanism similar to that shown in my reissued Patent 13,930 already referred to. This mechanism comprises means for moving the grinding wheel toward and away from the reamer supporting devices. As illustrated in Figs. 19 to 26 the grinding wheel 2 is mounted on a shaft 119 rotatable in bearings forming parts of a support 120. The support 120 is mounted on a carriage 121 which in turn is mounted on a main frame 122 which also carries the aforesaid bed 3. Mechanism for moving and controlling the carriage 121 and the grinding wheel comprises an auxiliary carriage 123 having movement in a direction transverse to that of the carriage 121. The said carriages are so constructed and arranged that as the carriage 123 is moved longitudinally in one direction or the other a suitable transverse movement is imparted to the carriage 121 and to the grinding wheel 2 supported thereon. A lug 124 is connected rigidly to the carriage 121 and has sliding contact with a cam piece 125 upon the carriage 123. The face of the member 125 in contact with the lug 124 is so shaped that for a given motion of the carriage 123 a desired motion will be imparted to the carriage 121.

For the purpose of varying the relative position and movement of the two carriages the member 125 is pivotally mounted and has a suitable adjusting means coacting therewith. The adjusting means comprises a screw 126 threaded into a block 127 upon the carriage 123, the tapered end of the screw bearing upon a suitably shaped surface of the cam 125. As the screw is turned the position of the cam faces upon the member 125 will be varied relatively to the carriage 123 upon which the member 125 is carried. Also carried upon the carriage 121 is a roller 128 and a second cam piece 129 is fixed upon the carriage 123. The roller 128 and the cam piece 129 contact with each other at certain times in order to control the movement of the carriage 121 with respect to the carriage 123.

The carriage 123 is provided with a member for engaging an actuating means which serves to move and control the carriage 123 and thereby the carriage 121 and the grind-wheel 2. The said member is a roller 130, which is in engagement with a cam 131 mounted upon a rotatable shaft 132. The cam has surfaces 133, 134 and 135 (shown in Fig. 24 and in dotted lines in Figs. 22 and 23) suitably shaped to impart movement to the carriage 123. The cam member 131 is adjustable upon the shaft 132, thus serving to adjust the position of the carriage 123. The adjusting means comprises a screw thread on the shaft 132 with which the member 131 has threaded engagement, and lock nuts 136 for holding it in its adjusted position.

The driving and controlling means comprises a belt pulley 137 connected by bevel gearing 138 to a shaft 139. Upon the shaft is a worm 140 in mesh with a worm wheel 141 upon a shaft 142. A gear 143 upon the other end of the shaft 142 meshes with an intermediate gear 144 which in turn meshes with a gear 145 upon the shaft 132. One end of the shaft 139 is journaled in a lug upon a sleeve 146 loosely mounted in the main shaft of the machine, and the other end in a bearing 147 pivotally mounted upon a lever 148 which is in turn pivotally mounted at 149 upon the machine frame. By this construction the shaft 139 may, by the action of the lever 148, be dropped at one end so that the worm which it carries falls out of mesh with the gear. A suitable pin-and-slot connection 150 is provided for limiting the movement of the lever 148. Fixed upon a shaft 151 suitably mounted on the frame of the machine is a lever 152 pulled by a spring 153. Fixed also upon the shaft 151 is a hook 154 which is adapted to engage with a lug 155 upon the lever 148. An arm 156 fixed to the lever 152 is connected by a link 157 to a lever 158 having at its free end a friction roll 159 located in the path of the lug 160 upon a disk 161 carried upon the shaft 132.

When a reamer has been mounted on the centers and set in motion in the way already described, the other parts of the machine operate in the following manner, it being understood that the pulley 137 is constantly rotated. Initially, the hook 154 is out of engagement with the lug 155 and the lever 148 is at its lowermost position holding the worm 140 out of engagement with the worm wheel 141. The operator lifts the lever 148, and the hook 154, yielding against the spring 153, snaps into position beneath the lug. The shafts 142 and 132 are thus caused to rotate.

Figures 19, 22:
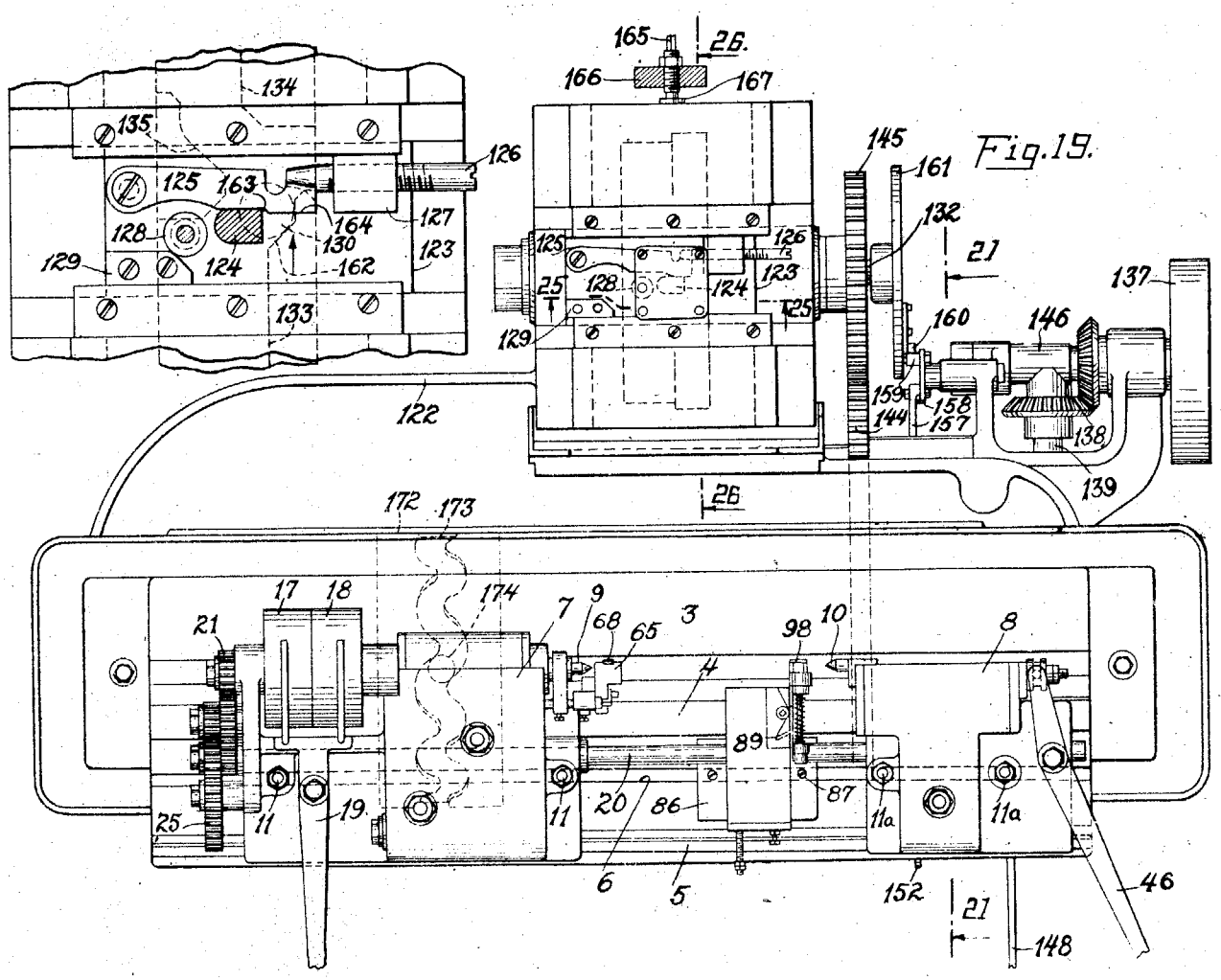

The carriage 121 and the auxiliary carriage 123 may be regarded as being substantially in the positions shown in Fig. 22. The roller 130, by the rotation of the shaft 132, rides along the first steep portion 162 of the cam 131, moving the carriage 123 quickly to the left. The lug 124 also rides up the first steep incline 163 upon the cam surface of the member 125, thus giving the carriage 121 together with the grinding wheel 2 and other parts, a relatively quick idle movement toward the reamer. The roller 130 is now in contact with the slightly inclined cam surface 133 on the cam 131 and slowly but positively or unyieldingly moves the carriage 123 toward the left. During substantially all of this movement the lug 124 is in contact with the next inclined face 164 of the cam piece 125, which has a very small degree of inclination and is slowly and positively moving or feeding the wheel toward the reamer to keep the wheel and the reamer in operative relation as the reamer is ground. The extent and speed of this feeding movement are determined by the shape of the cam surfaces and by the adjustment of the screw 126. Referring especially to Fig. 24, it will be noted that the cam surface 133 extends into the cam surface 134, which is straight and therefore allows the carriage 123 to remain stationary as the member 131 rotates. There is therefore, no approaching or feeding movement of the carriage and the grinding wheel while the roller 130 is traveling along the surface 134. Preferably, in order to positively and definitely limit the approaching or feeding movement of the carriage and the wheel, there is provided an adjustable stop comprising a screw 165 threaded into a lug 166 fixed to the carriage 121. One face of the screw 165 is adapted to contact with a suitable face 167 carried upon the frame of the machine. This additional limiting means acts when there is any spring or play in the work or in the connected parts between the wheel and the devices for controlling its movement.

It will be understood that after the approaching or feeding movement is stopped the grinding wheel and the reamer continue to turn and a supplemental grinding of the reamer is effected to remove any unevenness that may be due to the vibration or springing of the various supporting elements. This supplemental grinding continues during at least one complete revolution of the reamer.

As the shaft 132 continues to rotate, the roller 130 comes into contact with the cam piece 135 and the carriage 123 is given a relatively quick transverse movement toward the left. At substantially the same time the roller 128 upon the carriage 121 comes into contact with the cam piece 129 on the carriage 123 and the carriage 121 is thus moved backward, carrying the grinding wheel away from the work. It will thus be seen that the separation of the wheel and the work occurs at a definite period after the approaching movement has ceased. At about this time the lug 160 upon the disk 161 engages the roller 159 on the lever 158. The lever 158 is moved in a counter-clockwise direction and by means of the link 157 serves to move the lever 152 in the same direction and to turn the shaft 151. As the shaft moves, the hook 154 releases the pin 155 and permits the lever 148 to drop, thus releasing the worm 140 from engagement with the worm wheel 141. Then the operator removes the reamer which has been ground and a new one is put in place and the machine is ready for further operation in the way described.

In order to provide for grinding the reamers accurately to any desired size, means are preferably provided whereby the wheel support 130 may be adjusted along the carriage 121. This means comprises a rotatable screw-threaded rod 168 rotatable in a block 169 upon the carriage 121 and threaded into a lug 170 upon the support 120. Suitable means are provided for rotating the threaded rod 168 through any desired angle, this means as shown being a micrometer-head 171.

Usually when a broad-faced wheel is used as shown in Fig. 1, it is found necessary or at least desirable to construct the wheel in a plurality of sections as shown. In order that there may be no unevenness of grinding at the division planes between the sections, provision is made for effecting a relative transverse movement between the wheel and the reamer. It is immaterial whether the movement is effected by moving the work or by moving the grinding wheel, but in the drawings, mechanism is shown for moving the work. The bed 3 is so mounted on the main frame 122 as to be capable of longitudinal movement. Located adjacent the bed is a cam member 172 mounted on the aforesaid shaft 142. The cam member 172 has in its periphery an undulatory cam groove 173 which co-acts with a roller 174 carried by the bed. It will be seen, therefore, that when the shaft 142 and the cam member 172 are rotated, the bed 3 together with the headstock and tailstock and other parts mounted thereon, will be given a reciprocatory or vibratory movement. The said movement serves to insure uniform grinding along the entire length of the reamer and may also serve to permit the grinding wheel to act on a reamer having a length somewhat greater than the width of the wheel.

From the foregoing description, it will be clear that in addition to providing a new and useful machine, I have also provided a new and useful method or process for grinding reamers. The reamer is simultaneously turned and reciprocated toward and from the grinding wheel in such a way that the proper relief is obtained, the wheel engaging each reamer tooth but once during each revolution of the reamer. Preferably the wheel engages the reamer throughout its entire length and preferably there is effected a relative feeding movement between the reamer and the wheel whereby additional grinding of the teeth is effected at each revolution of the reamer. When the reamer teeth are unevenly spaced, the turning is effected in such a way as to present the teeth to the wheel properly notwithstanding the uneven spacing.

What I claim is:

1. The combination in a mechanism for grinding, of a reamer holding means, means for bodily reciprocating the reamer along lines perpendicular to its axis, and means for simultaneously turning the reamer to present successive teeth for grinding and relieving at successive reciprocations, the last said means serving to turn the reamer while it is being ground thus providing each tooth with a convex relief surface.

2. The combination of a cylindrical grinding wheel, means for holding a reamer with its axis parallel to the wheel axis, means for bodily reciprocating the reamer toward and from the wheel along lines perpendicular to its axis, and means for simultaneously turning the reamer to present successive teeth to the wheel for grinding and relieving at successive reciprocations, the last said means serving to turn the reamer while it is in engagement with the wheel thus providing each tooth with a convex relief surface.

3. The combination in a mechanism for grinding, of a reamer holding means, means for bodily reciprocating the reamer along lines perpendicular to its axis, means for simultaneously turning the reamer to present successive teeth for grinding and relieving at successive reciprocations, the last said means serving to turn the reamer while it is being ground thus providing each tooth with a convex relief surface, and means for relatively changing the rate of turning to accord with the number of teeth on the reamer.

4. The combination in a mechanism for grinding, of a reamer holding means, means for bodily reciprocating the reamer along lines perpendicular to its axis, and means for turning the reamer during the reciprocation thereof to present successive teeth for grinding and relieving at successive reciprocations and for varying the rate of turning during a single revolution in accordance with unevenly spaced teeth on the reamer, the last said means serving to turn the reamer while it is being ground thus providing each tooth with a convex relief surface.

5. The combination in a mechanism for grinding, of a reamer holding means, means for bodily reciprocating the reamer along lines perpendicular to its axis, means for simultaneously turning the reamer to present successive teeth for grinding and relieving at successive reciprocations, the last said means serving to turn the reamer while it is being ground thus providing each tooth with a convex relief surface, and means for changing the amount of relief.

6. The combination in a mechanism for grinding, of a reamer holding means, means for bodily reciprocating the reamer along lines perpendicular to its axis, means for simultaneously turning the reamer to present successive teeth for grinding and relieving at successive reciprocations, the last said means serving to turn the reamer while it is being ground thus providing each tooth with a convex relief surface, and means for changing the extent of reciprocation to change the amount of relief.

7. The combination in a mechanism for grinding, of a reamer holding means, means for bodily reciprocating the reamer along lines perpendicular to its axis, and means for simultaneously turning the reamer intermittently tooth by tooth to present successive teeth for grinding and relieving at successive reciprocations, the last said means serving to turn the reamer while it is being ground thus providing each tooth with a convex relief surface.

8. The combination in a mechanism for grinding, of a reamer holding means, and means for bodily reciprocating the reamer along lines perpendicular to its axis and for simultaneously turning it intermittently through varying angles corresponding to uneven spacing of the teeth to present successive teeth for grinding and relieving at successive reciprocations.

9. The combination in a mechanism for grinding, of a reamer holding means, means for bodily reciprocating the reamer along lines perpendicular to its axis, and a reciprocating device for successively engaging the teeth of the reamer to turn it intermittently to present successive teeth for grinding and relieving at successive reciprocations.

10. The combination in a mechanism for grinding, of a reamer holding means, means for oscillating the reamer axis about an eccentric longitudinal axis to effect relieving of the teeth, means for turning the reamer to present successive teeth for grinding and relieving, and means for changing the amount of relief while maintaining constant the eccentricity of the axis of oscillation.

11. The combination in a mechanism for grinding, of a reamer holding means, and means for oscillating the reamer axis about an eccentric longitudinal axis and for simultaneously turning the reamer to present successive teeth for grinding and relieving at successive oscillations.

12. The combination in a mechanism for grinding, of a reamer holding means, means for oscillating the reamer axis about an eccentric longitudinal axis and for simultaneously turning the reamer to present successive teeth for grinding and relieving at successive oscillations, and means for changing the amount of relief while maintaining constant the eccentricity of the axis of oscillation.

13. The combination in a mechanism for grinding, of a reamer holding means, means for oscillating the reamer axis about an eccentric longitudinal axis and for simultaneously turning the reamer to present successive teeth for grinding and relieving at successive oscillations, and means for changing the amount of relief while maintaining constant the amplitude of oscillation and the eccentricity of the axis thereof.

14. The combination in a mechanism for grinding, of a reamer holding means, means for oscillating the reamer axis about an eccentric longitudinal axis and for simultaneously turning the reamer to present successive teeth for grinding and relieving at successive oscillations, and means for changing the amplitude of oscillation.

15. The combination in a mechanism for grinding, of a headstock, a tailstock, centers carried respectively by the headstock and tailstock, means for bodily reciprocating the centers in unison relatively to the headstock and tailstock respectively, and means carried by the headstock for engaging a reamer to turn it with respect to the centers in timed relation to the reciprocation thereof.

16. The combination in a mechanism for grinding, of a headstock, a tailstock, centers carried respectively by the headstock and tailstock, a shaft connecting the headstock and the tailstock, means actuated by the shaft for bodily reciprocating the centers in unison relatively to the headstock and tailstock respectively, and means carried by the headstock for engaging a reamer to turn it with respect to the centers in timed relation to the reciprocation thereof.

17. The combination in a mechanism for grinding, of a headstock and a tailstock of which one is adjustable toward and from the other, centers carried respectively by the headstock and tailstock, means for bodily reciprocating the centers in unison relatively to the headstock and tailstock respectively, and means carried by the headstock for engaging a reamer to turn it with respect to the centers in timed relation to the reciprocation thereof.

18. The combination in a mechanism for grinding, of a reamer holding means, means for bodily reciprocating the reamer along lines perpendicular to its axis, a reciprocating device for successively engaging the teeth of the reamer to turn it intermittently to present successive teeth for grinding and relieving at successive reciprocations, and means engaging the reamer to prevent backward turning thereof.

19. The combination in a mechanism for grinding, of a reamer holding means, means for bodily reciprocating the reamer along lines perpendicular to its axis, a reciprocating device for successively engaging the teeth of the reamer to turn it intermittently to present successive teeth for grinding and relieving at successive reciprocations, and frictionally acting means engaging the reamer to prevent backward turning thereof.

20. The combination in a mechanism for grinding, of a reamer holding means, means for bodily reciprocating the reamer along lines perpendicular to its axis, a reciprocating device for successively engaging the teeth of the reamer to turn it intermittently to present successive teeth for grinding and relieving at successive reciprocations, and means engaging the reamer to prevent backward turning thereof, the said means being adjustable longitudinally of the reamer.

21. The combination in a mechanism for grinding, of a headstock, a tailstock, centers carried respectively by the headstock and tailstock, means for bodily reciprocating the centers relatively to the headstock and tailstock respectively, a reciprocating device carried by the headstock for successively engaging the teeth of a reamer on the centers to turn it intermittently to present successive teeth for grinding and relieving at successive reciprocations, and means engaging the reamer to prevent backward turning thereof.

22. The combination in a mechanism for grinding, of a headstock, a tailstock, centers carried respectively by the headstock and tailstock, means for bodily reciprocating the centers relatively to the headstock and tailstock respectively, a reciprocating device carried by the headstock for successively engaging the teeth of a reamer on the centers to turn it intermittently to present successive teeth for grinding and relieving at successive reciprocations, and means engaging the reamer to prevent backward turning thereof, the said means being adjustable longitudinally of the reamer.

23. The combination in a mechanism for grinding, of a headstock, a tailstock, centers carried respectively by the headstock and tailstock, a shaft connecting the headstock and tailstock, means actuated by the said shaft for bodily reciprocating the centers relatively to the headstock and tailstock respectively, a reciprocating device carried by the headstock for successively engaging the teeth of a reamer on the centers to turn it intermittently to present successive teeth for grinding and relieving at successive reciprocations, a bracket adjustably positioned between the headstock and the tailstock and provided with an aperture through which the shaft extends, and means carried by the bracket for engaging the reamer to prevent backward turning thereof.

24. The combination in a mechanism for grinding, of a spindle movable about a longitudinal axis, a device carried by the spindle for holding a reamer with its axis eccentric of the spindle axis, means for oscillating the spindle, and a reamer turning device mounted on the spindle and movable about the axis of the reamer.

25. The combination in a mechanism for grinding, of a spindle movable about a longitudinal axis, a device carried by the spindle for holding a reamer with its axis eccentric of the spindle axis, means for oscillating the spindle, a reamer turning device mounted on the spindle and movable about the axis of the reamer, and operating means for the said device comprising two meshing gears, one of which is mounted for movement concentrically with the device.

26. The combination in a mechanism for grinding, of a spindle movable about a longitudinal axis, a device carried by the spindle for holding a reamer with its axis eccentric of the spindle axis, means for oscillating the spindle, and a device mounted on the spindle for oscillation about the axis of the reamer, the said device engaging the reamer to intermittently turn it.

27. The combination in a mechanism for grinding, of a reamer holding means adapted to reciprocate the reamer along lines perpendicular to its axis, and a reamer turning device mounted to move with the reamer as it reciprocates and also to move about the axis thereof, the said device having a reamer engaging element which is adjustable longitudinally thereof.

28. The combination in a mechanism for grinding, of a reamer holding means adapted to reciprocate the reamer along lines perpendicular to its axis, and a device mounted to move with the reamer as it reciprocates and also to oscillate about the axis thereof, the said device having a pawl which is adjustable longitudinally thereof and which is adapted to engage the reamer to turn it intermittently.

29. The combination in a mechanism for grinding, of a reamer holding means comprising a spindle movable about a longitudinal axis eccentric of the reamer axis, means for oscillating the spindle, a sleeve mounted on the spindle for oscillation about the axis of the reamer, a pin carried by the sleeve and extending parallelly with the reamer, a support for the pin having a bearing on the spindle independent of the sleeve but coaxial therewith, and a pawl carried by the pin and adapted to engage the reamer teeth to intermittently rotate the reamer when the sleeve is oscillated.

30. The combination in a mechanism for grinding, of a reamer holding means comprising a spindle movable about a longitudinal axis eccentric of the reamer axis, means for oscillating the spindle, a pawl mounted on the spindle for oscillation about the axis of the reamer and adapted to engage the reamer teeth to intermittently rotate the reamer, and means permitting endwise adjustment of the pawl to determine the position of each tooth at the end of its forward rotative movement.

31. The combination in a mechanism for grinding, of a reamer holding means comprising a spindle movable about a longitudinal axis eccentric of the reamer axis, means for oscillating the spindle, a pawl mounted on the spindle for oscillation about the axis of the reamer and adapted to engage the reamer teeth to intermittently rotate the reamer, and means permitting adjustment of the pawl toward and from the reamer axis to position it to engage reamers of different diameters.

32. The combination in a mechanism for grinding, of a reamer holding means comprising a spindle movable about a longitudinal axis eccentric of the reamer axis, means for oscillating the spindle, a pawl mounted on the spindle for oscillation about the axis of the reamer and adapted to engage the reamer teeth to intermittently rotate the reamer, and means for changing the angle of oscillation of the pawl.

33. The combination in a mechanism for grinding, of a reamer holding means comprising a spindle movable about a longitudinal axis eccentric of the reamer axis, means for oscillating the spindle, a pawl mounted on the spindle for oscillation about the axis of the reamer and adapted to engage the reamer teeth to intermittently rotate the reamer, and means for changing the angle of oscillation of the pawl without changing its limit of forward movement.

34. The combination in a machine for grinding, of a reamer holding means adapted to reciprocate the reamer along lines perpendicular to its axis, a reamer turning device mounted to move with the reamer as it reciprocates and also to oscillate about the axis thereof, a lever connected with the said device, a second lever extending in the same general direction as the first lever and having operative connection therewith, and a cam rotatable in timed relation with the reciprocation of the reamer and serving to oscillate the second said lever and thereby oscillate the reamer turning device.

35. The combination in a mechanism for grinding, of a reamer holding means adapted to reciprocate the reamer along lines perpendicular to its axis, a reamer turning device mounted to move with the reamer as it reciprocates and also to oscillate about the axis thereof, a lever connected with the said device, a second lever extending in the same general direction as the first lever, a lug adjustable along one of the levers and engaging the other, and a cam rotatable in timed relation with the reciprocation of the reamer and serving to oscillate the second said lever and thereby oscillate the reamer turning device, the angle of oscillation of the said device being adjustable by adjusting the said lug.

36. The combination in a mechanism for grinding, of a reamer holding means adapted to reciprocate the reamer along lines perpendicular to its axis, a pawl mounted to move with the reamer as it reciprocates and also to oscillate about the axis thereof, the pawl successively engaging the reamer teeth to intermittently rotate the reamer, a lever connected with the pawl, a second lever extending in the same general direction as the first lever, a lug adjustable along one of the levers and engaging the other, and a cam rotatable in timed relation with the reciprocation of the reamer and serving to oscillate the second said lever and thereby oscillate the reamer turning device, the said levers being parallel when the pawl is in its extreme forward position and when the second lever is in an extreme position, whereby adjustment of the lug may be effected without changing the said extreme forward position of the pawl.

37. The combination in a mechanism for grinding, of a reamer holding means adapted to reciprocate the reamer in planes perpendicular to its axis, a reamer turning device mounted to move with the reamer as it reciprocates and also to oscillate about the axis thereof, a pivoted lever, a second lever extending in the same general direction as the first lever and having operative connection therewith, a cam rotatable in timed relation with the reciprocation of the reamer and serving to oscillate the second said lever and thereby oscillate the first said lever, and means comprising toothed gears connecting the first said lever with the reamer turning device to oscillate it.

38. The combination in a mechanism for grinding, of a reamer holding means comprising a spindle movable about a longitudinal axis eccentric of the reamer axis, a reamer turning device mounted to oscillate about the reamer axis, a lever connected with the spindle, a second lever extending in the same general direction as the first said lever and having operative connection therewith, and a cam rotatable in timed relation with the oscillation of the reamer turning device and serving to oscillate the second lever and thereby oscillate the spindle.

39. The combination in a mechanism for grinding, of a reamer holding means comprising a spindle movable about a longitudinal axis eccentric of the reamer axis, a reamer turning device mounted to oscillate about the reamer axis, a lever connected with the spindle, a second lever extending in the same general direction as the first lever, a lug adjustable along one of the levers and engaging the other, and a cam rotatable in timed relation with the oscillation of the reamer turning device and serving to oscillate the second said lever and thereby oscillate the spindle, the angle of oscillation of the spindle being adjustable by adjusting the lug.

40. The combination in a mechanism for grinding, of a reamer holding means comprising a headstock center and a tailstock center both movable about a common longitudinal axis eccentric of the reamer axis, a reamer turning device mounted to oscillate about the reamer axis, devices for oscillating the said centers each comprising a lever connected with the corresponding center, a second lever extending in the same general direction as the first lever and having operative connection therewith and a cam serving to oscillate the second said lever and thereby oscillate the center, and a single shaft serving to rotate the cam in timed relation with the oscillation of the reamer turning device.

41. The combination in a mechanism for grinding, of a reamer holding means comprising a headstock having a center carrying a spindle movable about a longitudinal axis eccentric of the reamer axis and a tailstock having a center movable about the same eccentric longitudinal axis, a reamer turning device mounted on the spindle to oscillate about the reamer axis, devices for oscillating the spindle and tailstock center each comprising a lever connected with the spindle, a second lever extending in the same general direction as the first lever and having operative connection therewith and a cam serving to oscillate the second said lever, and a single shaft serving to rotate the said cams in timed relation with the reciprocation of the reamer.

42. The combination in a mechanism for grinding, of a reamer holding means adapted to reciprocate the reamer along lines per pendicular to its axis, an oscillating pawl for engaging the reamer teeth to intermittently rotate the reamer, and a friction clamp for preventing backward rotation of the reamer, the said clamp being adjustable longitudinally of the reamer.

43. The combination in a mechanism for grinding, of a reamer holding means adapted to reciprocate the reamer along lines perpendicular to its axis, an oscillating pawl for engaging the reamer teeth to intermittently rotate the reamer, a friction clamp for preventing backward rotation of the reamer, and a support for the clamp permitting its movement into and out of operative position.

44. The combination in a mechanism for grinding, of a reamer holding means adapted to reciprocate the reamer along lines perpendicular to its axis, an oscillating pawl for engaging the reamer teeth to intermittently rotate the reamer, and a friction clamp for engaging the reamer shank to prevent backward rotation of the reamer, the said clamp having friction members which are adjustable toward and from each other to adapt the clamp for engaging shanks of different diameters.

45. The combination in a mechanism for grinding, of a reamer holding means adapted to reciprocate the reamer along lines perpendicular to its axis, an oscillating pawl for engaging the reamer teeth to intermittently rotate the reamer, a friction clamp for engaging the reamer shank to prevent backward rotation of the reamer, the said clamp having friction members which are adjustable toward and from each other to adapt the clamp for engaging shanks of different diameters, and means for moving the said members uniformly with respect to a fixed center line.

46. The combination in a mechanism for grinding, of a reamer holding means adapted to reciprocate the reamer along lines perpendicular to its axis, an oscillating pawl for engaging the reamer teeth to intermittently rotate the reamer, a friction clamp for engaging the reamer shank to prevent backward rotation of the reamer, the said clamp comprising supporting blocks which are adjustable toward and from each other, and spring-pressed friction members movably mounted on the blocks.

47. The combination in a mechanism for grinding, of a reamer holding means adapted to reciprocate the reamer along lines perpendicular to its axis, an oscillating pawl for engaging the reamer teeth to intermittently rotate the reamer, and a friction clamp for engaging the reamer shank to prevent backward rotation of the reamer, the said clamp comprising supporting blocks which are adjustable toward and from each other, levers pivoted on the blocks and provided respectively with friction members, a right angled arm on one of the levers and a spring-pressed rod mounted on the other lever and engaging the said arm to swing the friction members toward each other.

48. The combination with a reamer holding means and a grinding wheel, of means for effecting reciprocations to vary the distance between the reamer and the wheel and for automatically turning the reamer simultaneously to cause successive teeth to engage the wheel at successive reciprocations, and automatic mechanism for effecting rapid longitudinal relative vibrations between the reamer and the wheel.

49. The combination with a reamer holding means and a grinding wheel, of means for effecting reciprocations to vary the distance between the reamer and the wheel, means for turning the reamer to cause successive teeth to engage the wheel at successive reciprocations, and automatic mechanism for effecting an approaching movement between the reamer and the wheel.

50. The combination with a reamer holding means and a grinding wheel, of means for effecting reciprocations to vary the distance between the reamer and the wheel, means for turning the reamer to cause successive teeth to engage the wheel at successive reciprocations, automatic mechanism for effecting an approaching movement between the reamer and the wheel, and automatic mechanism for effecting rapid longitudinal relative vibrations between the reamer and the wheel.

51. The combination with a reamer holding means and a grinding wheel, of means for effecting reciprocations to vary the distance between the reamer and the wheel, means for turning the reamer to cause successive teeth to engage the wheel at successive reciprocations, and automatic mechanism for effecting an approaching movement between the reamer and the wheel and for automatically stopping the said movement when a predetermined relative position is reached.

52. The combination with a reamer holding means and a grinding wheel, of means for effecting reciprocations to vary the distance between the reamer and the wheel, means for turning the reamer to cause successive teeth to engage the wheel at successive reciprocations, and automatic mechanism for effecting an approaching movement between the reamer and the wheel, for automatically stopping the said movement when a predetermined relative position is reached and for automatically effecting a separating movement.

53. The combination with a reamer holding means and a grinding wheel, of means for effecting reciprocations to vary the distance between the reamer and the wheel, means for turning the reamer to cause successive teeth to engage the wheel at successive reciprocations, and automatic mechanism for effecting an approaching movement between the reamer and the wheel, for automatically stopping the said movement when a predetermined relative position is reached, for automatically maintaining the said relative position during at least one complete rotation of the reamer and for thereafter automatically effecting a separating movement.

54. The combination with a reamer holding means and a grinding wheel, of means for effecting reciprocations to vary the distance between the reamer and the wheel, means for intermittently turning the reamer to cause successive teeth to engage the wheel at successive reciprocations, and automatic mechanism for effecting an approaching movement between the reamer and the wheel.

55. The combination with a reamer holding means and a grinding wheel, of means for effecting reciprocations to vary the distance between the reamer and the wheel, means for intermittently turning the reamer through varying angles corresponding to uneven spacing of the teeth to cause successive teeth to engage the wheel at successive reciprocations, and automatic mechanism for effecting an approaching movement between the reamer and the wheel.

56. The combination with a reamer holding means and a grinding wheel, of means for reciprocating the reamer toward and from the wheel, means for turning the reamer to cause successive teeth to engage the wheel at successive reciprocations, and automatic mechanism for effecting an approaching movement between the reamer and the wheel.

57. The herein described method of grinding and relieving a reamer, which consists in effecting relative reciprocation to vary the distance between the reamer and a moving grinding surface, in simultaneously turning the reamer to cause a different tooth to be presented for grinding and relieving at each reciprocation, and in relatively feeding the reamer and the grinding surface toward each other to cause additional grinding at each rotation of the reamer.

58. The herein described method of grinding and relieving a reamer, which consists in effecting relative reciprocation to vary the distance between the reamer and a moving grinding surface, in simultaneously turning the reamer to cause a different tooth to be presented for grinding and relieving at each reciprocation, the said turning taking place while the reamer is in engagement with the grinding surface thus providing each tooth with a convex relief surface, and in relatively feeding the reamer and the grinding surface toward each other to cause additional grinding at each rotation of the reamer.

59. The herein described method of grinding and relieving a reamer, which consists in effecting relative reciprocation to vary the distance between the reamer and a moving grinding surface having an effective width at least as great as the length of the reamer teeth, in simultaneously turning the reamer to cause a different tooth to be presented for grinding and relieving throughout its entire length at each reciprocation, and in relatively feeding the reamer and the grinding surface toward each other to cause additional grinding at each rotation of the reamer.

60. The herein described method of grinding and relieving a reamer, which consists in effecting relative reciprocation to vary the distance between the reamer and a moving grinding surface, in simultaneously turning the reamer to cause a different tooth to be presented for grinding and relieving at each reciprocation, in effecting relative longitudinal vibration between the reamer and the wheel during grinding, and in relatively feeding the reamer and the grinding surface toward each other to cause additional grinding at each rotation of the reamer.

61. The herein described method of grinding and relieving a reamer, which consists in effecting relative reciprocation to vary the distance between the reamer and a moving grinding surface, in simultaneously turning the reamer to cause a different tooth to be presented for grinding and relieving at each reciprocation, in relatively feeding the reamer and the grinding surface toward each other to cause additional grinding at each rotation of the reamer, and in supplementally rotating the reamer through at least one revolution after the feed has ceased.

62. The herein described method of grinding and relieving a reamer, which consists in effecting relative reciprocation between the reamer and a moving grinding surface, in simultaneously turning the reamer in a manner varying in accordance with the spacing of the reamer teeth to cause a different tooth to be presented for grinding and relieving at each reciprocation, and in relatively feeding the reamer and the grinding surface toward each other to cause additional grinding at each rotation of the reamer.

63. A machine tool having a tool holder and a rocking frame, one of which oscillates about a fixed axis for producing relative movement between the tool and the work for producing relief in the work, means for rotating the work in the work holder, a rotating cam, a pivoted arm actuated by said cam, a rider carried by the aforesaid part which oscillates, for transmitting the movement of the arm to the part which oscillates, said rider being adjustable relatively to the axis of the part which oscillates.

64. A machine tool having a rocking frame for swinging the work toward and from the tool for taking an eccentric cut, a cam for oscillating the rocking frame, a pivotally supported arm adapted to be oscillated about its pivot by said cam, and a rider directly co-operating with the arm and the rocking frame for transmitting the oscillatory movement of the arm to the rocking frame, said rider being adjustable toward and from the axis of one of the elements with which it directly co-operates.

65. A cutter grinder having a work spindle for rotating the cutter, a rocking frame wherein said spindle is journaled, a tool spindle having a tool thereon located at the rear of the frame, a rotatable cam mechanism in front of the tool spindle for rocking said frame, and adjustable means between said cam mechanism and said work spindle to thereby move the work variable distances toward and from the tool.

In testimony whereof, I hereto affix my signature.

FRIEDERICH MÜLLER.